(12) United States Patent
Khude et al.

(10) Patent No.: US 8,982,853 B2
(45) Date of Patent: Mar. 17, 2015

(54) METHODS AND APPARATUS TO CONTROL INTERFERENCE

(71) Applicant: QUALCOMM Incorporated, San Diego, CA (US)

(72) Inventors: Nilesh Nilkanth Khude, Somerset, NJ (US); Junyi Li, Chester, NJ (US); Vincent Douglas Park, Budd Lake, NJ (US); Saurabha Rangrao Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 13/784,829

(22) Filed: Mar. 5, 2013

(65) Prior Publication Data

US 2014/0254564 A1 Sep. 11, 2014

(51) Int. Cl.
*H04W 4/00* (2009.01)
*H04W 72/04* (2009.01)
*H04W 16/10* (2009.01)
*H04W 84/04* (2009.01)

(52) U.S. Cl.
CPC .......... *H04W 72/0426* (2013.01); *H04W 16/10* (2013.01); *H04W 84/045* (2013.01)
USPC ............ 370/336; 370/252; 370/328; 370/338

(58) Field of Classification Search
USPC ......................................................... 370/336
See application file for complete search history.

(56) References Cited

U.S. PATENT DOCUMENTS

| | | | |
|---|---|---|---|
| 6,091,757 A | 7/2000 | Cudak et al. | |
| 6,847,826 B1 | 1/2005 | Wesby et al. | |
| 7,912,092 B2 | 3/2011 | Kowalski | |
| 8,094,738 B2 | 1/2012 | Nishio et al. | |
| 2002/0115474 A1 | 8/2002 | Yoshino et al. | |
| 2009/0180435 A1* | 7/2009 | Sarkar | 370/330 |
| 2009/0196192 A1* | 8/2009 | Lim et al. | 370/252 |

(Continued)

FOREIGN PATENT DOCUMENTS

| | | |
|---|---|---|
| CN | 102469466 A | 5/2012 |
| EP | 2627141 A2 | 8/2013 |
| WO | WO-2011095211 A1 | 8/2011 |

OTHER PUBLICATIONS

ISA/EPO, International Search Report and Written Opinion of the International Searching Authority, Int'l. App. No. PCT/US2014/019279, May 22, 2014, European Patent Office, Rijswijk, NL, 10 pgs.

*Primary Examiner* — Ian N Moore
*Assistant Examiner* — Jenee Williams
(74) *Attorney, Agent, or Firm* — Holland & Hart LLP

(57) ABSTRACT

Methods and apparatus for controlling interference with regard to important control signals, e.g., synchronization signals and broadcast channel signals, are described. A configurable base station monitors for and receives signals from other base stations in its local vicinity and determines the implemented frame timings corresponding to the other deployed base stations. If possible, the configurable base station selects to use a frame timing offset which is different from the frame timing offsets being used by the other base stations. In some embodiments, symbol level and subframe level synchronization are maintained between the base stations; however, frame level synchronization may, and sometimes does vary. Different adjacent base stations may, and sometimes do, intentionally offset their frame boundaries by multiples of a subframe.

20 Claims, 15 Drawing Sheets

COMMUNICATIONS SYSTEM

(56) References Cited

U.S. PATENT DOCUMENTS

| | | | |
|---|---|---|---|
| 2009/0252332 A1* | 10/2009 | Chang et al. | 380/287 |
| 2010/0034141 A1* | 2/2010 | Meylan | 370/328 |
| 2010/0039948 A1* | 2/2010 | Agrawal et al. | 370/252 |
| 2010/0136997 A1* | 6/2010 | Palanki et al. | 455/452.1 |
| 2010/0216486 A1 | 8/2010 | Kwon et al. | |
| 2010/0232318 A1* | 9/2010 | Sarkar | 370/252 |
| 2010/0296410 A1* | 11/2010 | Kazmi et al. | 370/252 |
| 2010/0315963 A1* | 12/2010 | Jading et al. | 370/252 |
| 2010/0330992 A1* | 12/2010 | Bhattacharjee et al. | 455/436 |
| 2011/0039499 A1* | 2/2011 | Zhang et al. | 455/67.11 |
| 2011/0076960 A1* | 3/2011 | Yun et al. | 455/67.14 |
| 2011/0170440 A1* | 7/2011 | Gaal et al. | 370/252 |
| 2011/0250927 A1* | 10/2011 | Nakada | 455/525 |
| 2011/0280223 A1* | 11/2011 | Maeda et al. | 370/335 |
| 2011/0299614 A1 | 12/2011 | Kim et al. | |
| 2012/0026952 A1* | 2/2012 | Okubo et al. | 370/329 |
| 2012/0040674 A1* | 2/2012 | McGilly et al. | 455/436 |
| 2012/0052869 A1* | 3/2012 | Lindoff et al. | 455/452.1 |
| 2012/0082022 A1* | 4/2012 | Damnjanovic et al. | 370/328 |
| 2012/0113825 A1* | 5/2012 | Baglin et al. | 370/252 |
| 2012/0122453 A1* | 5/2012 | Shin et al. | 455/434 |
| 2012/0294185 A1* | 11/2012 | Queseth et al. | 370/252 |
| 2012/0300686 A1* | 11/2012 | Maeda et al. | 370/311 |
| 2012/0307715 A1* | 12/2012 | Maeda et al. | 370/315 |
| 2013/0136028 A1* | 5/2013 | Gan et al. | 370/252 |
| 2013/0176883 A1* | 7/2013 | Han et al. | 370/252 |
| 2014/0086173 A1* | 3/2014 | Sadeghi et al. | 370/329 |
| 2014/0211677 A1* | 7/2014 | Barbieri et al. | 370/329 |

* cited by examiner

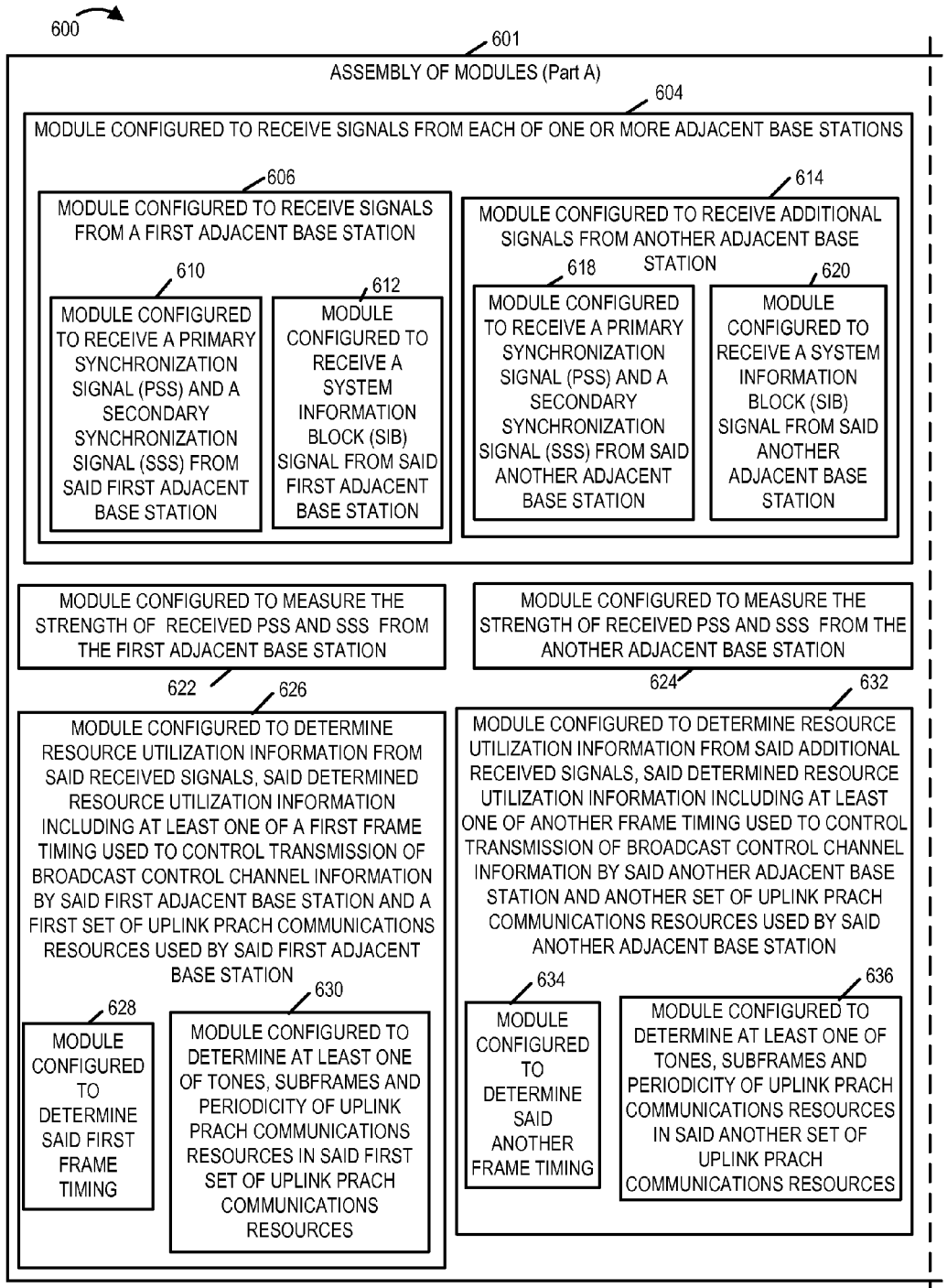

METHODS AND APPARATUS TO CONTROL INTERFERENCE

FIELD

Various embodiments are related to controlling interference in a wireless communications system, and, more particularly, to controlling interference to some specific control information in a wireless communications system including configurable adjacent base stations, e.g., configurable adjacent LTE femto cell base stations.

BACKGROUND

In LTE based cellular systems various synchronization signals including, e.g., primary synchronization signal/secondary synchronization signal (PSS/SSS) and a broadcast channel (BCH) signal are transmitted at a fixed position in frequency and time in a frame. These signals are important for a user equipment (UE) device to start decoding information from an eNode B (eNB). Since PSS/SSS and BCH signals are the very first pieces of system information that a UE device seeks to acquire, their location relative to the structure of the frame cannot be changed.

Consider a dense and unplanned deployment of LTE small cells, e.g., femto cells, in a single frequency band. If the small cells are synchronous at the frame level, then the synchronization signals, (PSS/SSS) and BCH channel signals, of the small cells may collide with each other. This tends to increase interference to a UE device that is trying to detect the small cells. One easy solution can be that the small cells be asynchronous. This solves the problem of BCH and PSS/SSS collisions. However, this approach makes inter cell interference coordination methods, e.g., enhanced inter-cell interference coordination (eICIC), schemes ineffective since the devices act asynchronously.

Based on the above discussion, there is a need for new methods and apparatus to control interference when small cells, e.g., femto cells, are to be operated using a single common frequency band. It would be beneficial if at least some new methods and apparatus decreased interference with regard to detecting some important control signals being transmitted by adjacent base stations yet provided for some level of common synchronization so that inter-cell interference coordination (ICIC) schemes and/or other interference management can still be effective.

SUMMARY

Methods and apparatus for controlling interference with regard to important control signals, e.g., synchronization signals and/or broadcast channel signals, are described. In some embodiments, the important control signals of interest are transmitted in a predetermined position in a timing structure being used, e.g. the important control signals of interest are transmitted in a predetermined one or a predetermined few subframes of a frame in a timing structure being used. Various described methods and apparatus are well suited for an environment in which a plurality of configurable small cell base stations, e.g., configurable LTE femto cell base stations, are dynamically deployed in a region, e.g., on an as needed basis and using a common frequency band. In various embodiments, a configurable base station monitors for and receives signals from other base stations in its local vicinity and determines the implemented frame timings corresponding to the other deployed base stations. If possible, the configurable base station selects to use a frame timing which is offset from the frame timing being used by the other base stations. In some embodiments, symbol level and subframe level synchronization are maintained between the base stations. However, in at least some such embodiments, frame level synchronization may, and sometimes does vary. Different adjacent base stations may, and sometimes do, intentionally offset their frame boundaries by multiples of a subframe.

A method of operating a configurable base station, in accordance with some embodiments, includes receiving signals from a first adjacent base station and determining resource utilization information from said received signals, said determined resource utilization information including at least one of a first frame timing used to control transmission of broadcast control channel information by said first adjacent base station and a first set of uplink physical random access channel (PRACH) communications resources used by said first adjacent base station. The exemplary method further includes selecting, based on said determined resource utilization information, at least one of a second frame timing or a second set of uplink PRACH communications resources to be used by said configurable base station, said second frame timing being different from said first frame timing and said second set of uplink PRACH communications resources being different from said first set of uplink PRACH communications resources.

An exemplary configurable base station, in accordance with some embodiments, includes at least one processor configured to: receive signals from a first adjacent base station and determine resource utilization information from said received signals, said determined resource utilization information including at least one of a first frame timing used to control transmission of broadcast control channel information by said first adjacent base station and a first set of uplink PRACH communications resources used by said first adjacent base station. In some such embodiments, the at least one processor is further configured to select, based on said determined resource utilization information, at least one of a second frame timing or a second set of uplink PRACH communications resources to be used by said configurable base station, said second frame timing being different from said first frame timing and said second set of uplink PRACH communications resources being different from said first set of uplink PRACH communications resources. The exemplary configurable base station further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE DRAWINGS

FIG. 6A is a first part of a drawing of an assembly of modules, which can, and in some embodiments is, used in the exemplary configurable base station illustrated in FIG. 5.

DETAILED DESCRIPTION

Figure 1:
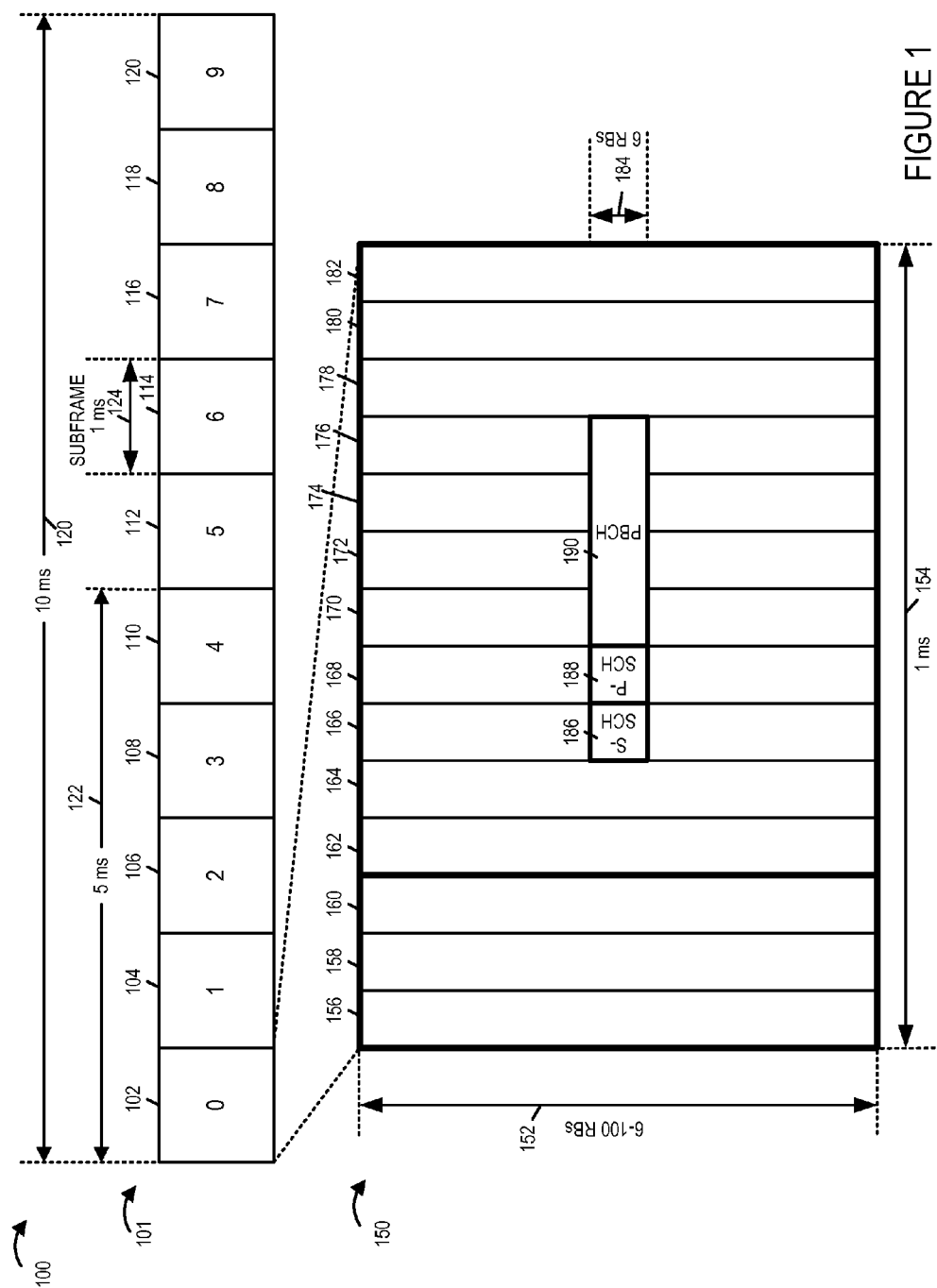
FIG. 1 illustrates the location of the primary synchronization signal channel, secondary synchronization signal channel, and broadcast channel within the first subframe of a recurring frame structure, in accordance with an exemplary embodiment.

FIG. 1 illustrates the location of the primary synchronization signal channel, secondary synchronization signal channel, and broadcast channel within the first subframe of a recurring frame structure, in accordance with an exemplary embodiment. Drawing 100 of FIG. 1 illustrates an exemplary frame 100 and exemplary air link resources 150 corresponding to subframe 0. Exemplary frame 100 includes 10 subframes (subframe 0 102, subframe 1 104, subframe 2 106, subframe 3 108, subframe 4 110, subframe 5 112, subframe 6 114, subframe 7 116, subframe 8 118, subframe 9 120). Frame 101 has a duration 10 milli-sec as indicated by line 120; a half-frame has a duration of 5 milli-sec as indicated by line 122, and a subframe has a duration of 1 milli-sec as indicated by line 124. Exemplary air link resources 150 corresponds to a frequency range of 6-100 resource blocks, as indicated by line 152 and a time duration of 1 milli-sec, as indicated by line 154. Air link resources 150 are partitioned, based on time, into resources, e.g. OFDM symbols (156, 158, 160, 162, 164, 166, 168, 170, 172, 174, 176, 178, 180, 182). The secondary synchronization channel (S-SCH) 186 used for carrying a secondary synchronization signal is located within resource 166; the primary synchronization channel (P-SCH) 188 used for carrying a primary synchronization signal is located within resource 168; and the physical broadcast channel (PBCH) 190 used for carrying broadcast channel signals is located within portions of resources 170, 172, 174 and 176. The S-SCH 186, P-SCH 188, and PBCH 190 are located within a 6 resource block (RB) wide frequency region, as indicated by line 184. The 6 RBs=72 Subcarriers=6×180 KHz=1.08 MHz.

Figure 2:
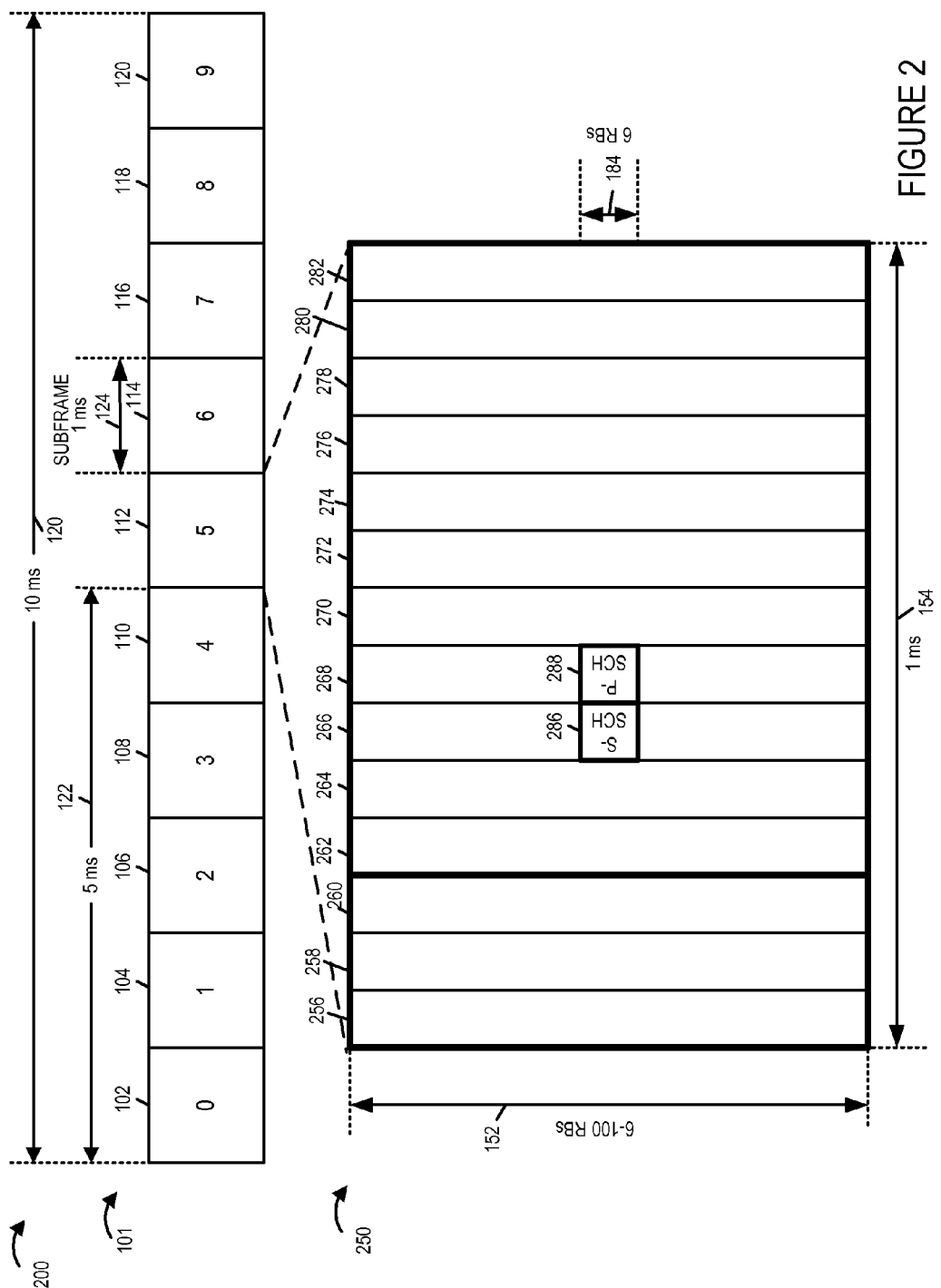
FIG. 2 illustrates the location of the primary synchronization signal channel, and secondary synchronization signal channel within the sixth subframe of a recurring frame structure in accordance with an exemplary embodiment.

FIG. 2 illustrates the location of the primary synchronization signal channel, and secondary synchronization signal channel within the sixth subframe of a recurring frame structure in accordance with an exemplary embodiment. Drawing 200 of FIG. 2 illustrates an exemplary frame 101 and exemplary air link resources 250 corresponding to subframe 5. Exemplary air link resources 250 corresponds to a frequency range of 6-100 resource blocks, as indicated by line 152 and a time duration of 1 milli-sec, as indicated by line 154. Air link resources 250 are partitioned, based on time, into resources (256, 258, 260, 262, 264, 266, 268, 270, 272, 274, 276, 278, 280, 282). The secondary synchronization channel (S-SCH) 286 used for carrying a secondary synchronization signal is located within resource 266; and the primary synchronization channel (P-SCH) 288 used for carrying a primary synchronization signal is located within resource 268. The S-SCH 286, P-SCH 288 are located within a 6 resource block (RB) wide frequency region, as indicated by line 184.

Figure 3:
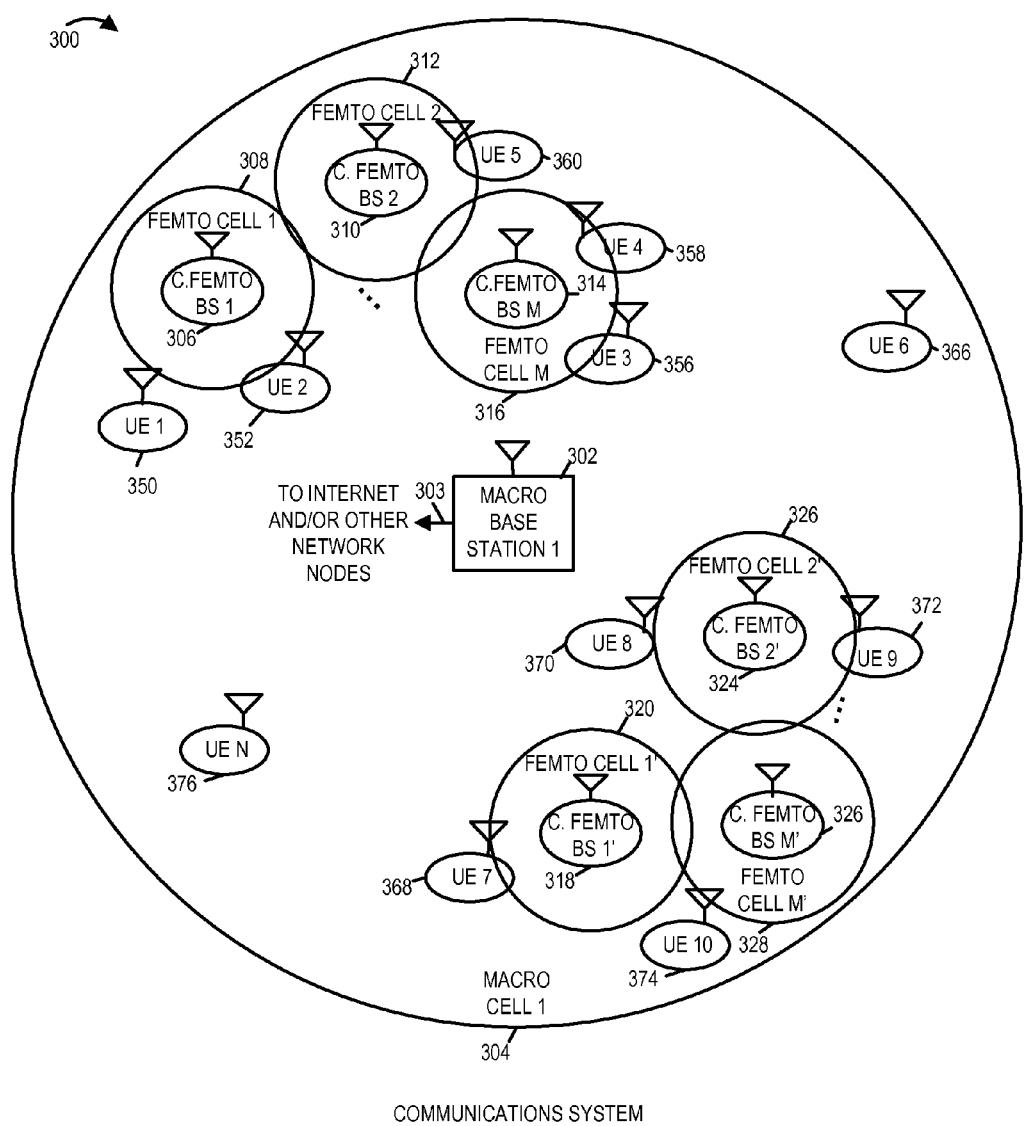
FIG. 3 illustrates a communications system in accordance with an exemplary embodiment.

FIG. 3 is a drawing of an exemplary communications system 300 in accordance with an exemplary embodiment. Exemplary communications system 300 includes a macro base station 1 302, e.g., an LTE eNode B, with a corresponding macro cell 1 coverage area 304. Macro base station 1 302 is coupled to the Internet and/or other network nodes, via link 303. Within macro cell 1 304, there are a plurality of configurable femto base stations with corresponding femto cells. At different times, there may be, and sometimes are, different numbers of configurable femto base stations operating within macro cell 1 304, e.g., the number of available configurable femto base stations which may be deployed may depend on factors such as number of user equipment devices in the macro cell or in a particular area of the macro cell at a given time, air link resource loading, interference environment, etc. In various embodiments, configurable femto cell base stations are added and/or removed as needed to support a current environment.

In a first localized area of macro cell 1 304 there are a plurality of configurable adjacent base stations (configurable femto base station 1 306, configurable femto base station 2 310, . . . , configurable femto base station M 314) with corresponding femto cells (femto cell 1 308, femto cell 2 312, . . . , femto cell M 316), respectively.

In a second localized area of macro cell 1 304 there are a plurality of configurable adjacent base stations (configurable femto base station 1' 318, configurable femto base station 2' 324, . . . , configurable femto base station M' 326) with corresponding femto cells (femto cell 1' 320, femto cell 2' 326, . . . , femto cell M' 328), respectively.

In exemplary system 300, there are also a plurality of user equipment (UE) devices, e.g., mobile wireless terminals, (UE 1 350, UE 2 352, UE 3 356, UE 4 358, UE 5 360, UE 6 366, UE 7 368, UE 8 370, UE 9 372, UE 10 374, . . . , UE N 376), which may move throughout system 300 and communicate with macro base station 1 302 or an operating femto base station in its local vicinity.

In accordance with a feature of some embodiments, a configurable base station, which is joining the system, e.g., deploying or activating, monitors for and receives synchronization signals, e.g., PSS and SSS, being transmitted by other adjacent configurable femto base stations in its local vicinity and determines its frame timing based on the received synchronization signals. For example, there are a predetermined number of alternative frame timings, e.g., 5 alternative frame timings, that may be selected corresponding to different frame start times. The alternative frame timings correspond to synchronization on a subframe basis, e.g., different indexed subframes align. The alternative frame timings result in the synchronization signals of interest, e.g., PSS/SSS, for each alternative frame timing being transmitted at a different time. This approach reduces interference from the perspective of a UE device attempting to detect multiple alternative femto base stations in its vicinity.

If possible, e.g., some of the alternative frame timing are still available, the configurable base station, which is joining the system, selects one of the alternative frame timings which is currently not being used by any adjacent base station. If each of the alternative frame timings are currently being used by adjacent base stations, then the configurable base station, which is joining the system, selects the frame timing corresponding to the weakest received signals. The selected frame timing is used by the configurable base station to transmit information including synchronization signals, e.g., PSS/SSS and broadcast control channel information.

In accordance with a feature of some embodiments, a configurable base station, which is joining the system, e.g., deploying or activating, monitors for and receives system information block (SIB) information signals being transmitted by other adjacent configurable femto base stations in its local vicinity and determines a set of uplink PRACH communications resources that it is to use which are different from uplink PRACH communications resources currently being used by other configurable femto base stations in its vicinity.

Figure 4A:
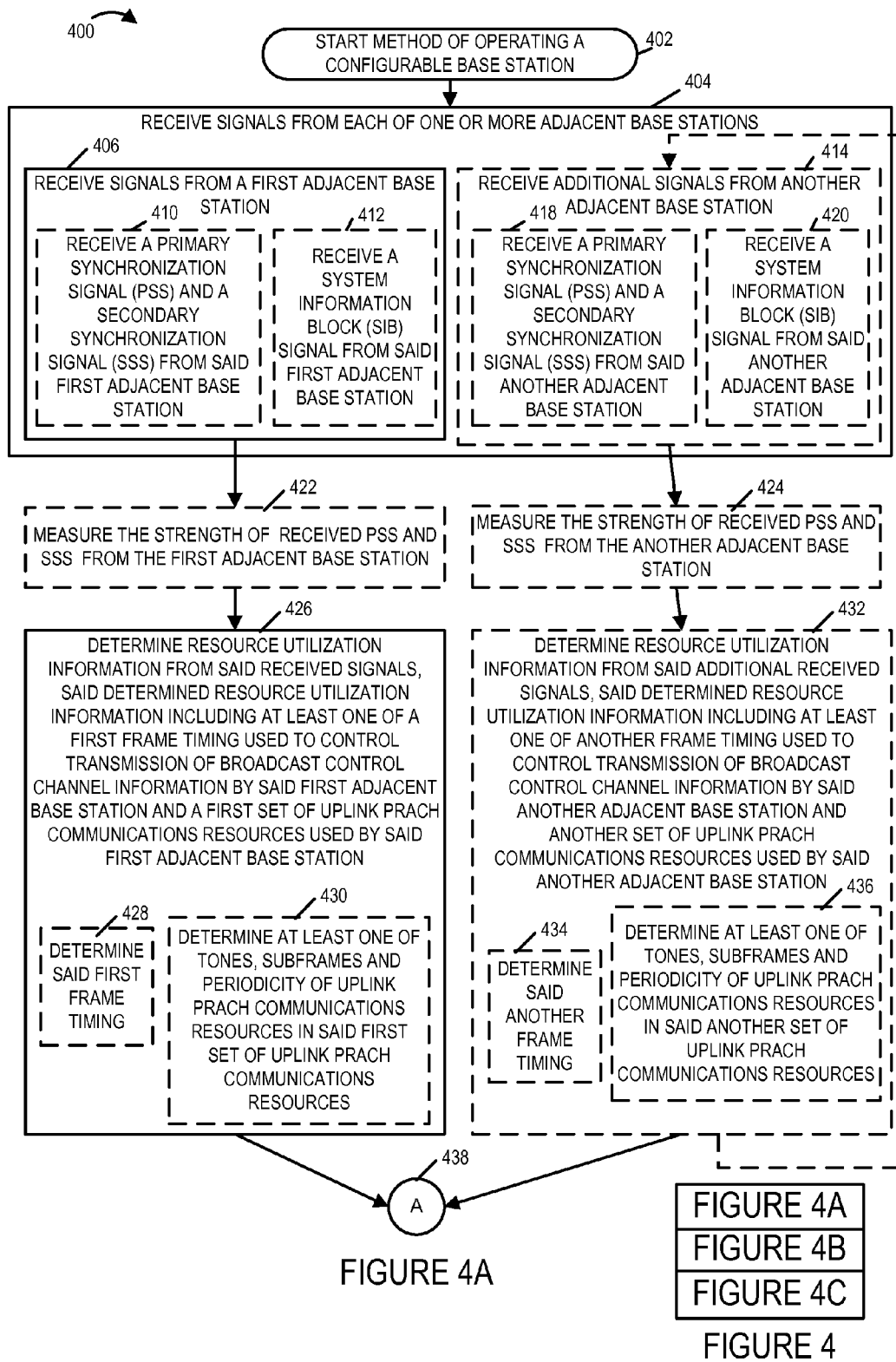
FIG. 4A is a first portion of a flowchart of an exemplary method of operating a configurable base station in accordance with various exemplary embodiments.
Figure 4B:
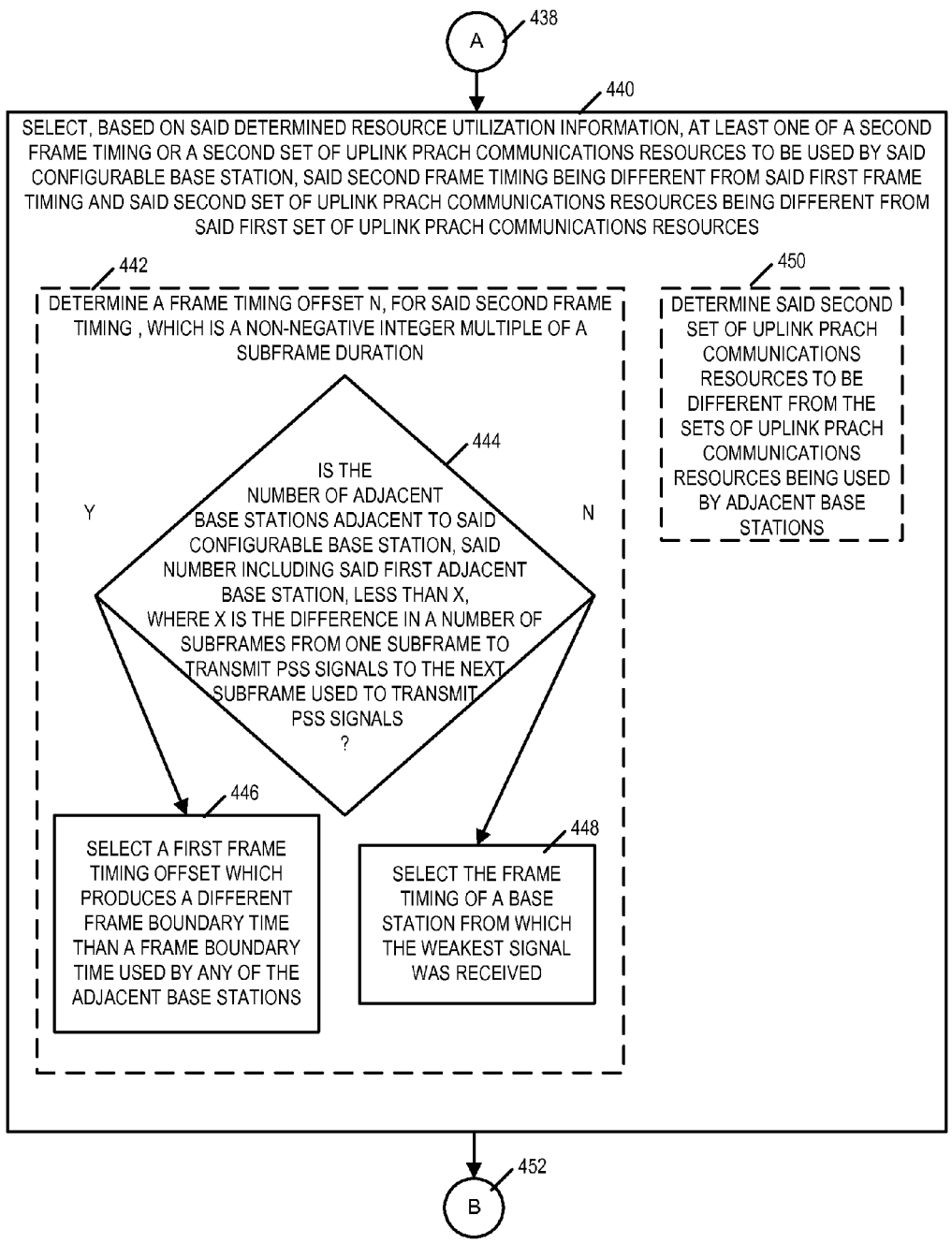
FIG. 4B is a second portion of a flowchart of an exemplary method of operating a configurable base station in accordance with various exemplary embodiments.
Figure 4C:
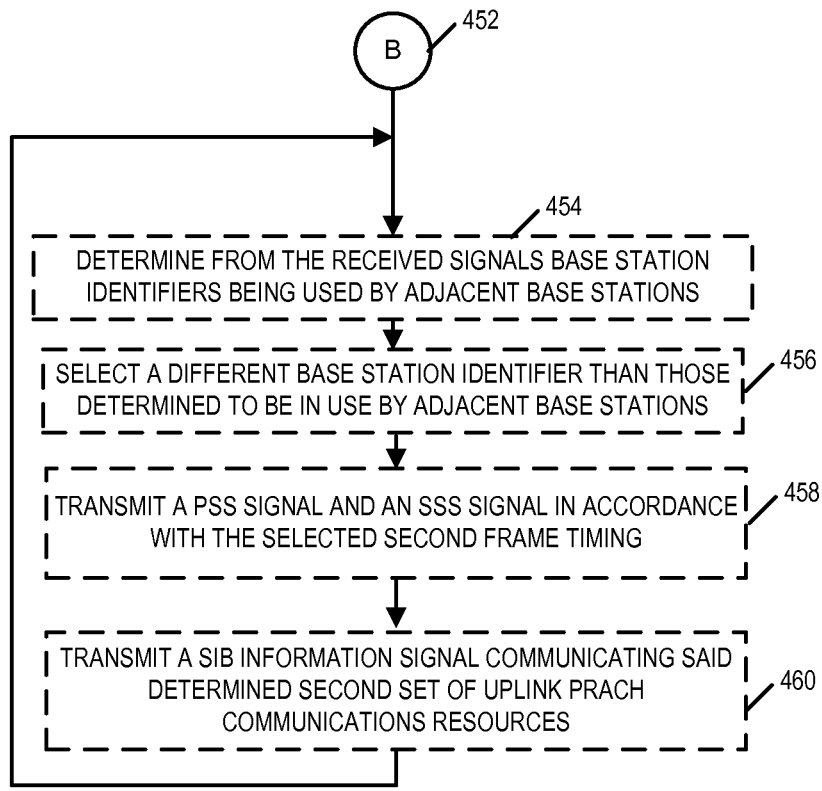
FIG. 4C is a third portion of a flowchart of an exemplary method of operating a configurable base station in accordance with various exemplary embodiments.

FIG. 4, comprising the combination of FIG. 4A, FIG. 4B, and FIG. 4C, is a flowchart 400 of an exemplary method of operating a configurable base station in accordance with various exemplary embodiments. Operation of the exemplary method starts in step 402, in which the configurable base station is powered on and initialized. Operation proceeds from step 402 to step 404.

In step 404, the configurable base station receives signals from each of one or more adjacent base stations. Step 404 includes step 406, in which the configurable base station receives signals from a first adjacent base station. Step 406 includes one or both of steps 410 and 412. In step 410 the configurable base station receives a primary synchronization signal (PSS) and a secondary synchronization signal (SSS) from the first adjacent base station. In step 412 the configurable base station receives a system information block (SIB) signal from the first adjacent base station.

In some embodiments, operation proceeds from step 406 to step 422. In other embodiments, operation proceeds from step 406 to step 426. Returning to step 422, in step 422 the configurable base station measures the strength of received PSS and SSS signals from the first adjacent base station. Operation proceeds from step 422 to step 426.

In step 426, the configurable base station determines resource utilization information from said received signal, said determined resource utilization information including at least one of a first frame timing used to control transmission of broadcast channel information by said first adjacent base station and a first set of uplink PRACH communications resources used by said first adjacent base station. In various embodiments, step 426 includes one or both of steps 428 and 430. In some embodiments, the received signals from the first adjacent base station include a primary synchronization signal (PSS) and a secondary synchronization signal (SSS), and step 428 is performed. In step 428, the configurable base station determines said first frame timing. In some embodiments, the received signals from the first adjacent base station include a system information block (SIB) signal, and step 430 is performed. In step 430 the configurable base station determines at least one of tones, subframes and periodicity of uplink PRACH communications resources in said first set of uplink PRACH communications resources. In some embodiments, determining periodicity of uplink PRACH communications resources in said first set of uplink PRACH communications resources includes determining how many subframes between PRACH in the timing structure.

Returning to step 404, in some embodiments step 404 includes step 414 in which the configurable base station receives additional signals from another adjacent base station. Step 414 includes one or both of steps 418 and 420. In step 418 the configurable base station receives a primary synchronization signal (PSS) and a secondary synchronization signal (SSS) from the another adjacent base station. In step 420 the configurable base station receives a system information block (SIB) signal from the another adjacent base station.

In some embodiments, operation proceeds from step 414 to step 424. In other embodiments, operation proceeds from step 414 to step 432. Returning to step 424, in step 424 the configurable base station measures the strength of received PSS and SSS signals from the another adjacent base station. Operation proceeds from step 424 to step 432.

In step 432, the configurable base station determines resource utilization information from said received additional signals, said determined resource utilization information including at least one of another frame timing used to control transmission of broadcast channel information by said another adjacent base station and another set of uplink PRACH communications resources used by said another adjacent base station. In various embodiments, step 432 includes one or both of steps 434 and 436. In step 434, the configurable base station determines said another frame timing. In step 436 the configurable base station determines at least one of tones, subframes and periodicity of uplink PRACH communications resources in said another set of uplink PRACH communications resources.

It should be appreciated that steps 414, 424 and 432 may be, and sometimes are repeated multiple times, e.g., corresponding to different another adjacent base stations, whose signal may be detected and recovered by the configurable base station.

Operation proceeds from steps 426 and step 432, via connecting node A 438 to step 440. In step 440, the configurable base station selects, based on said determined resource utilization information, at least one of a second frame timing or a second set of uplink PRACH communications resources to be used by said configurable base station, said second frame timing being different from said first frame timing and said second set of uplink PRACH communications resources being different from said first set of uplink PRACH communications resources. In various embodiments, step 440 includes one or both of steps 442 and 450.

In step 442 the configurable base station determines a frame timing offset N, for said second frame timing, which is a non-negative integer multiple of a subframe duration. In some embodiments, the configurable base station determines a frame timing offset N, for said second frame timing, which is a non-zero integer multiple of a subframe division.

This results in subframes being aligned between adjacent base stations but different frame boundaries, i.e., frames corresponding to different adjacent base stations start at different times. Thus different adjacent base stations may, and sometimes do, have subframes with different subframe index values being aligned. In some embodiments, N is in the range of 0 to 4, and a PSS is transmitted in the sixth subframe of a frame. In some such embodiments, N is in the range of 0 to 4 and a PSS and a SSS are transmitted in both the first and sixth subframes, e.g., sub-frame index number=0 and subframe index number=5 of a frame. Step 442 includes steps 444, 446 and 448. In step 444 the configurable base station determines whether or not the number of adjacent base stations adjacent to the configurable base station, said number including the first adjacent base station, is less than X, where X is the difference in a number of subframes from one subframe used to transmit PSS signals to the next subframe used to transmit PSS signals. In one examplary embodiment, PSS signals are transmitted in subframes with index number=0 and subframes with index number=5, and X=5. If the configurable base station determines that the number of adjacent base stations is less than X, then operation proceeds from step 444 to step 446; otherwise, operation proceeds from step 444 to step 448. Returning to step 446, in step 446 the configurable base station selects a first frame timing offset which produces a different frame boundary time than a frame boundary time used by any of the adjacent base stations. Retuning to step 448, in step 448 the configurable base station selects the frame timing of a base station from which the weakest signal was received.

Returning to step 450, in step 450, the configurable base station determines said second set of uplink PRACH communications resources to be different from the sets of uplink PRACH communications resources being used by adjacent base stations. In some embodiments said second set of uplink PRACH communications resources use communications resources that are non-overlapping with the sets of uplink PRACH communications resources being used by adjacent base stations.

Operation proceeds from step 440 via connecting node B 452, to one of steps 454 or step 460 or step 462, depending upon which signals were received and processed in step 404. The following description corresponds to an embodiment, in which the PSS/SSS signals, and SIB signals are detected and processed; however, it should be appreciated that one or more of steps 454, 456, 458, and 460 are omitted in some embodiments.

In step 454, the configurable base station determines from the received signals base station identifiers being used by adjacent base stations. Operation proceeds from step 454 to step 456 in which the configurable base station selects a different base station identifier than those determined to be in use by adjacent base stations.

Operation proceeds from step 456 to step 458. In step 458 the configurable base station transmits a PSS signal and an SSS signal in accordance with the selected second frame timing. Operation proceeds from step 458 to step 460. In step 460 the configurable base station transmits a SIB information signal communicating said determines second set of uplink PRACH communications resources. Operation proceeds from step 460 to the input of step 454.

In some embodiments, prior to step 404, the configurable base station receives a macro base station downlink signal from a macro base station, and the configurable base station determines a reference time based on the received signal from the macro base station. In some such embodiments, a configurable base station frame timing offset, e.g., frame timing offset N, is with respect to the reference time determined based on the downlink macro base station signal.

In various embodiments, the configurable base station identifies air link resources being used by other adjacent base stations for transmission of PSS/SSS and/or broadcast channel signals. In some such embodiments, the configurable base station refrains from transmitting on those identified resources and/or transmits at a reduced power level on those identified resources.

Figure 5:
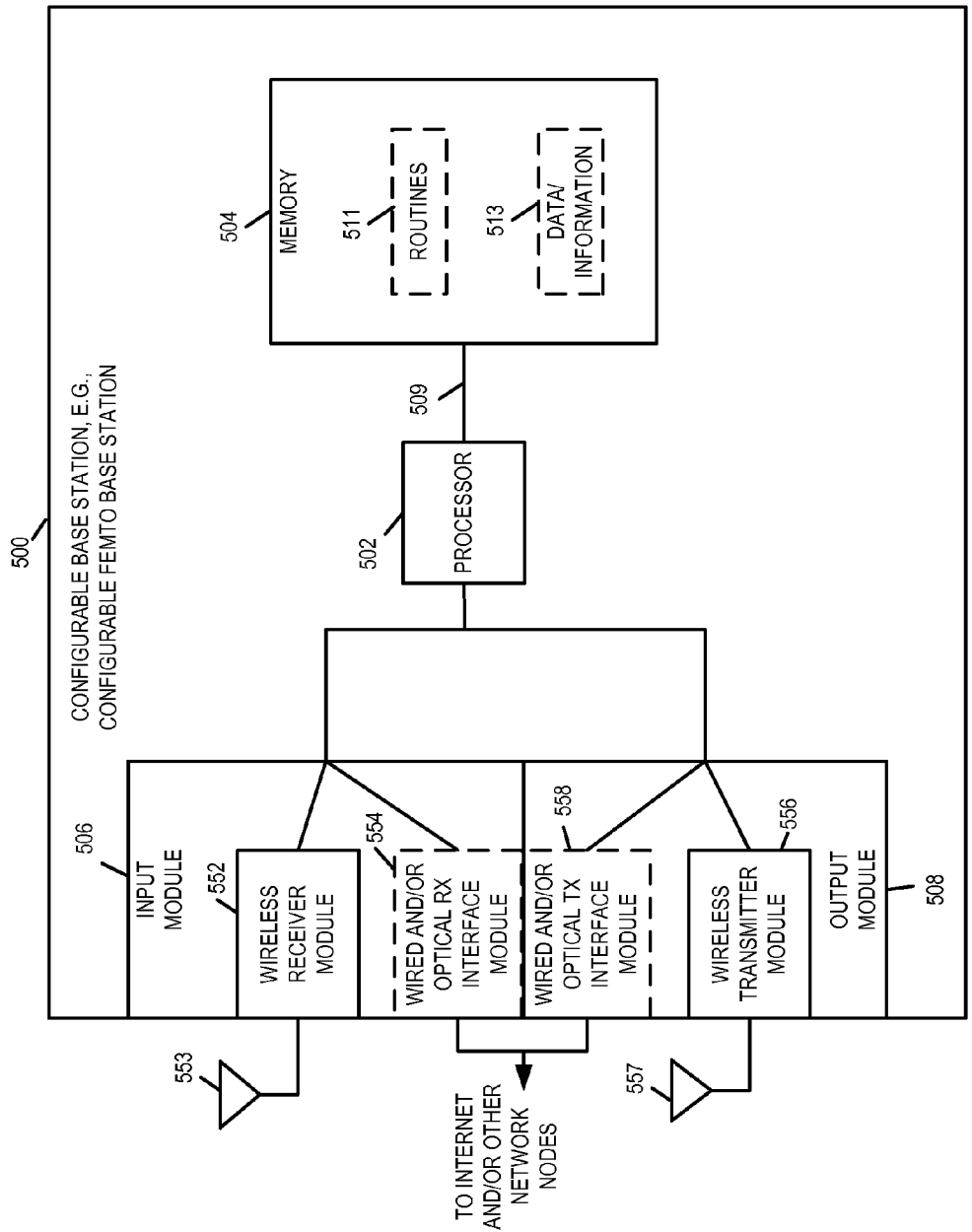
FIG. 5 is a drawing of an exemplary configurable base station in accordance with various exemplary embodiments.

FIG. 5 is a drawing of an exemplary configurable base station 500 in accordance with various exemplary embodiments. Configurable base station 500 is, e.g., one of the configurable base stations of system 300 of FIG. 3. In some embodiments, configurable base station 500 is a configurable LTE femto base station. Exemplary configurable base station 500 may, and sometimes does, implement a method in accordance with flowchart 400 of FIG. 4.

Configurable base station 500 includes a processor 502 and memory 504 coupled together via a bus 509 over which the various elements (502, 504) may interchange data and information. Configurable base station 500 further includes an input module 506 and an output module 508 which may be coupled to processor 502 as shown. However, in some embodiments, the input module 506 and output module 508 are located internal to the processor 502. Input module 506 includes a wireless receiver 552 for receiving input via receive antenna 553. Input module 506 can receive input signals. Input module 506 further includes a wired and/or optical input interface 554 for receiving input. Output module 508 includes a wireless transmitter 556 for transmitting output via transmit antenna 557. Output module 508 includes a wired and/or optical output interface 558 for transmitting output. In some embodiments, memory 504 includes routines 511 and data/information 513. In some embodiments, configurable base station 500 implements a frame structure in accordance with FIG. 1 and FIG. 2.

In some embodiments, processor 502 is configured to: receive signals from a first adjacent base station; determine resource utilization information from said received signal, said determined resource utilization information including at least one of a first frame timing used to control transmission of broadcast control channel information by said first adjacent base station and a first set of uplink PRACH communications resources used by said first adjacent base station; and select, based on said determined resource utilization information, at least one of a second frame timing or a second set of uplink PRACH communications resources to be used by said configurable base station, said second frame timing being different from said first frame timing and said second set of uplink PRACH communications resources being different from said first set of uplink PRACH communications resources.

In some embodiments, said signals include a primary synchronization signal (PSS) and a secondary synchronization signal (SSS); and processor 502 is configured to determine said first frame timing, as part of being configured to determine resource utilization information.

In some embodiments, said signals include a system information block (SIB) information signal; and processor 502 is configured to determine at least one of tones, subframes and periodicity of uplink PRACH communications resources in said first set of uplink PRACH communications resources, as part of being configured to determine resource utilization information.

In some embodiments, processor 502 is configured to determine a frame timing offset N which is a non-negative integer multiple of a subframe duration, as part of being configured to select, based on said determined resource utilization information, at least one of a second frame timing or a second set of uplink PRACH communications resources to be used by said configurable base station. In some embodiments, N is in the range of 0 to 4; and a PSS is transmitted in the sixth subframe of a frame.

In some such embodiments, processor 502 is configured to determine a frame timing offset N which is a non-zero integer multiple of a subframe duration, as part of being configured to select, based on said determined resource utilization information, at least one of a second frame timing or a second set of uplink PRACH communications resources to be used by said configurable base station. In some such embodiments, N is in the range of 1 to 4; and a PSS is transmitted in the sixth subframe of a frame.

In various embodiments, processor 502 is configured to select a first frame timing offset which produces a different frame boundary time than a frame boundary time used by any of the adjacent base stations when the number of adjacent base stations adjacent to the configurable base station, said number including the first adjacent base station, is less than X, where X is the difference in a number of subframes from one subframe used to transmit PSS signals to the next subframe used to transmit PSS signals, as part of being configured to determine a frame timing offset. In some such embodiments, processor 502 is configured to select the frame timing of a base station from which a weakest signal was received when the number of adjacent base stations is equal to or greater than X, as part of being configured to determine a frame timing offset.

In some such embodiments, processor 502 is further configured to: determine from the received signals base station identifiers being used by adjacent base stations; and selecting a different base station identifier than those determined to be in use by adjacent base stations.

Figure 6B:
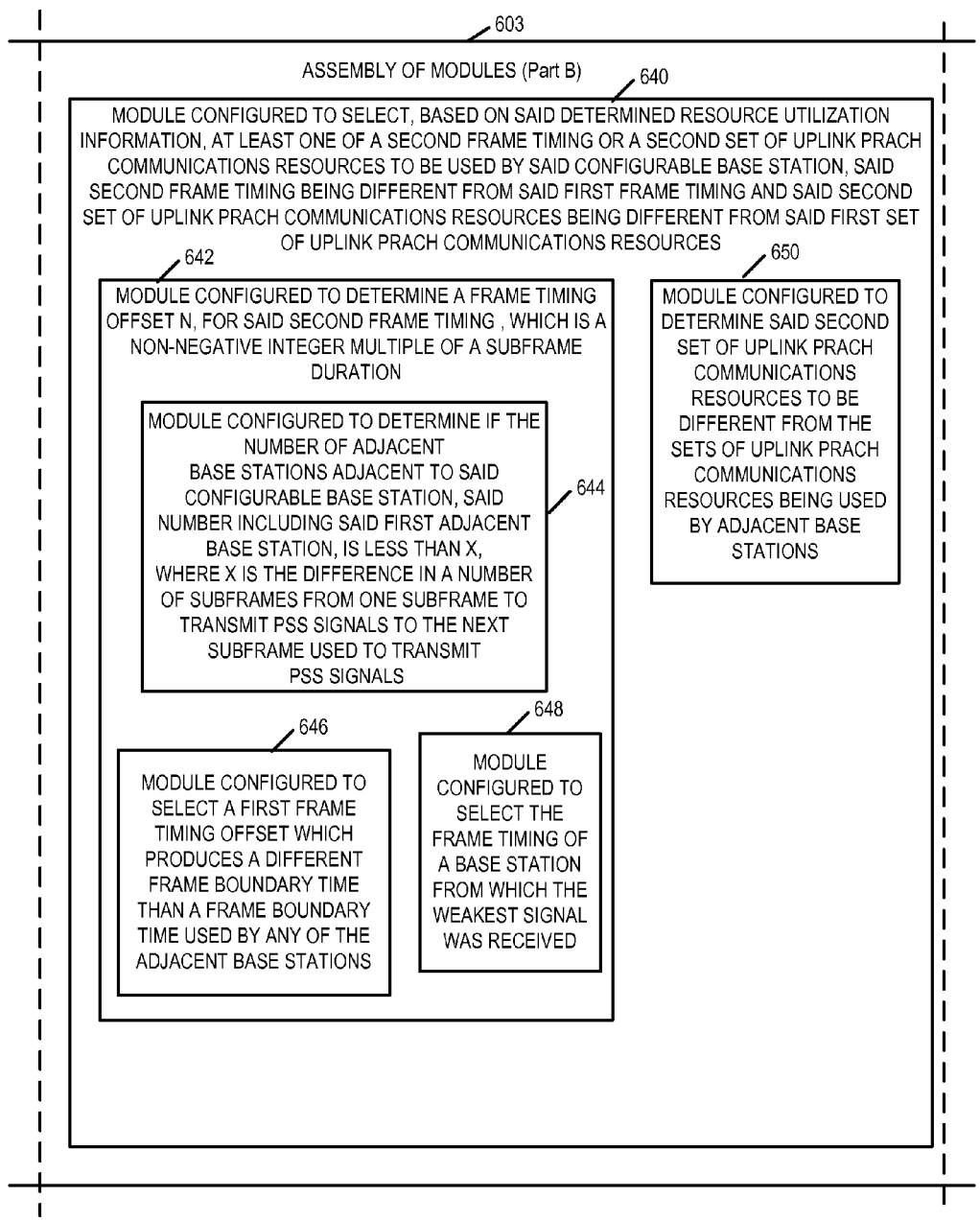
FIG. 6B is a second part of a drawing of an assembly of modules, which can, and in some embodiments is, used in the exemplary configurable base station illustrated in FIG. 5.
Figure 6C:
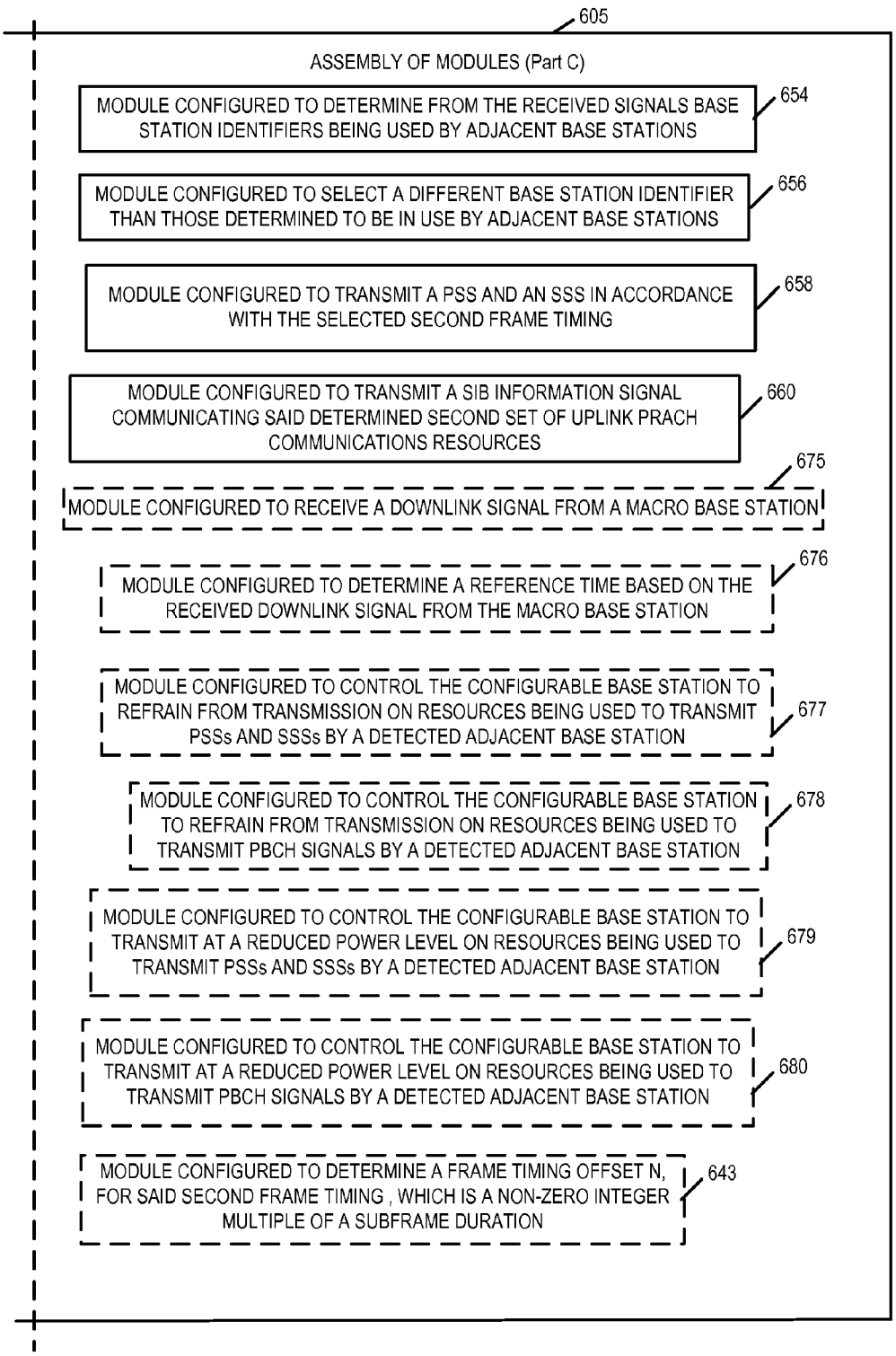
FIG. 6C is a first part of a drawing of an assembly of modules, which can, and in some embodiments is, used in the exemplary configurable base station illustrated in FIG. 5.

FIG. 6 is a drawing illustrating an assembly of modules 600, which can, and in some embodiments is, used in the exemplary configurable base station 500 illustrated in FIG. 5. The modules in the assembly 600 can be implemented in hardware within the processor 502 of FIG. 5, e.g., as individual circuits. Alternatively, the modules may be implemented in software and stored in the memory 504 of configurable base station 500 shown in FIG. 5. In some such embodiments, the assembly of modules 600 is included in routines 511 of memory 504 of configurable base station 500 of FIG. 5. While shown in the FIG. 5 embodiment as a single processor, e.g., computer, it should be appreciated that the processor 502 may be implemented as one or more processors, e.g., computers. When implemented in software the modules include code, which when executed by the processor, configure the processor, e.g., computer, 502 to implement the function corresponding to the module. In some embodiments, processor 502 is configured to implement each of the modules of the assembly of modules 600. In some embodiments where the assembly of modules 600 is stored in the memory 504, the memory 504 is a computer program product comprising a computer readable medium, e.g., a non-transitory computer readable medium, comprising code, e.g., individual code for each module, for causing at least one computer, e.g., processor 502, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the configurable base station 500 or elements therein such as the processor 502, to perform the functions of the corresponding steps illustrated and/or described in the method of flowchart 400 of FIG. 4.

Assembly of modules 600 comprises the combination of Part A 601, Part B 603 and Part C 605. Assembly of modules 600 includes a module 604 configured to receive signals from each of one or more adjacent base stations. Module 604 includes a module 606 configured to receive signals from a first adjacent base station and a module 614 configured to receive additional signals from another adjacent base station. Module 606 includes a module 610 configured to receive a primary synchronization signal (PSS) and a secondary synchronization signal (SSS) from said first adjacent base station and a module 612 configured to receive a system information block (SIB) signal from said first adjacent base station. Module 614 includes a module 618 configured to receive a primary synchronization signal (PSS) and a secondary synchronization signal (SSS) from said another adjacent base station and a module 620 configured to receive a system information block (SIB) signal from said another adjacent base station.

Assembly of modules 600 further includes a module 622 configured to measure the strength of a received primary synchronization signal (PSS) and a received secondary synchronization signal (SSS) from the first adjacent base station and a module 624 configured to measure the strength of a received primary synchronization signal (PSS) and a received secondary synchronization signal (SSS) from the another adjacent base station.

Assembly of modules 600 further includes a module 626 configured to determine resource utilization information from said received signals, said determined resource utilization information including at least one of a first frame timing used to control transmission of broadcast control channel information by said first adjacent base station and a first set of uplink PRACH communications resources used by said first adjacent base station. Module 626 includes a module 628 configured to determine said first frame timing and a module 630 configured to determine at least one of tones, subframes and periodicity of uplink PRACH communications resources in said first set of uplink PRACH communications resources.

Assembly of modules 600 further includes a module 632 configured to determine resource utilization information from said additional received signals, said determined resource utilization information including at least one of another frame timing used to control transmission of broadcast control channel information by said another adjacent base station and another set of uplink PRACH communications resources used by said another adjacent base station. Module 632 includes a module 634 configured to determine said another frame timing and a module 636 configured to determine at least one of tones, subframes and periodicity of uplink PRACH communications resources in said another set of uplink PRACH communications resources.

Assembly of modules 600 further includes a module 640 configured to select, based on the determined resource utilization information, at least one of a second frame timing or a second set of uplink PRACH communications resources to be used by said configurable base station, said second frame timing being different from said first frame timing and said second set of uplink PRACH communications resources being different from said first set of uplink PRACH communications resources. Module 640 includes a module 642 configured to determine a frame timing off N, for said second frame timing, which is a non-negative integer multiple of a subframe duration, and a module 650 configured to determine said second set of uplink PRACH communications resources to be different from the set of uplink PRACH communications resources being used by adjacent base station. Module 642 includes a module 644 configured to determine if the number of adjacent base stations adjacent to the configurable base station, said number including the first adjacent base station, is less than X, where X is the difference in a number of subframe from one subframe used to transmit PSS signals to the next subframe used to transmit PSS signals, a module 646 configured to select a first frame timing offset which produces a different frame boundary time than a frame boundary time used by any of the adjacent base stations, when the number of adjacent base stations is less than X, and a module 648 configured to select the frame timing of a base station from which the weakest signal was detected, when the number of adjacent base stations is greater than or equal to X.

Assembly of modules 600 further includes a module 654 configured to determine from the received signals base station identifiers being used by adjacent base station, a module 656 configured to select a different base station identifier than those determined to be in use by adjacent base stations, a module 658 configured to transmit a primary synchronization signal (PSS) and a secondary synchronization signal (SSS) in accordance with the selected second frame timing, and a module 660 configured to transmit a SIB information signal communicating said determined second set of uplink PRACH communications resources.

In some embodiments, assembly of modules 600 includes one or more or all of: a module 675 configured to receive a downlink signal from a macro base station, a module 676 configured to determine a reference time based on the received downlink signal from the macro base station, a module 677 configured to control the configurable base station to refrain from transmission on resources being used to transmit primary synchronization signals and secondary synchronization signals by a detected adjacent base station, a module 678 configured to control the configurable base station to refrain from transmission on resources being used to transmit physical broadcast channel signals by a detected adjacent base station, a module 679 configured to control the configurable base station to transmit at a reduced power level on resources being used to transmit primary synchronization signals and secondary synchronization signals by a detected adjacent base station, a module 680 configured to control the configurable base station to transmit at a reduced power level on resources being used to transmit physical broadcast channel signals by a detected adjacent base station, and a module 643 configured to determine a frame timing offset N, for said second frame timing, which is a non-zero multiple of a subframe duration.

In some embodiments, module 643 is used in place of module 642. In some embodiments, module 642 determines N to be one of 0, 1, 2, 3 and 4. In some embodiments, module 642 determines N to be one of 1, 2, 3 and 4.

In various embodiments, module 676 determines a reference time, and the frame timing offset N, which is in multiples of subframes, is with respect to the determined reference time.

Figure 7:
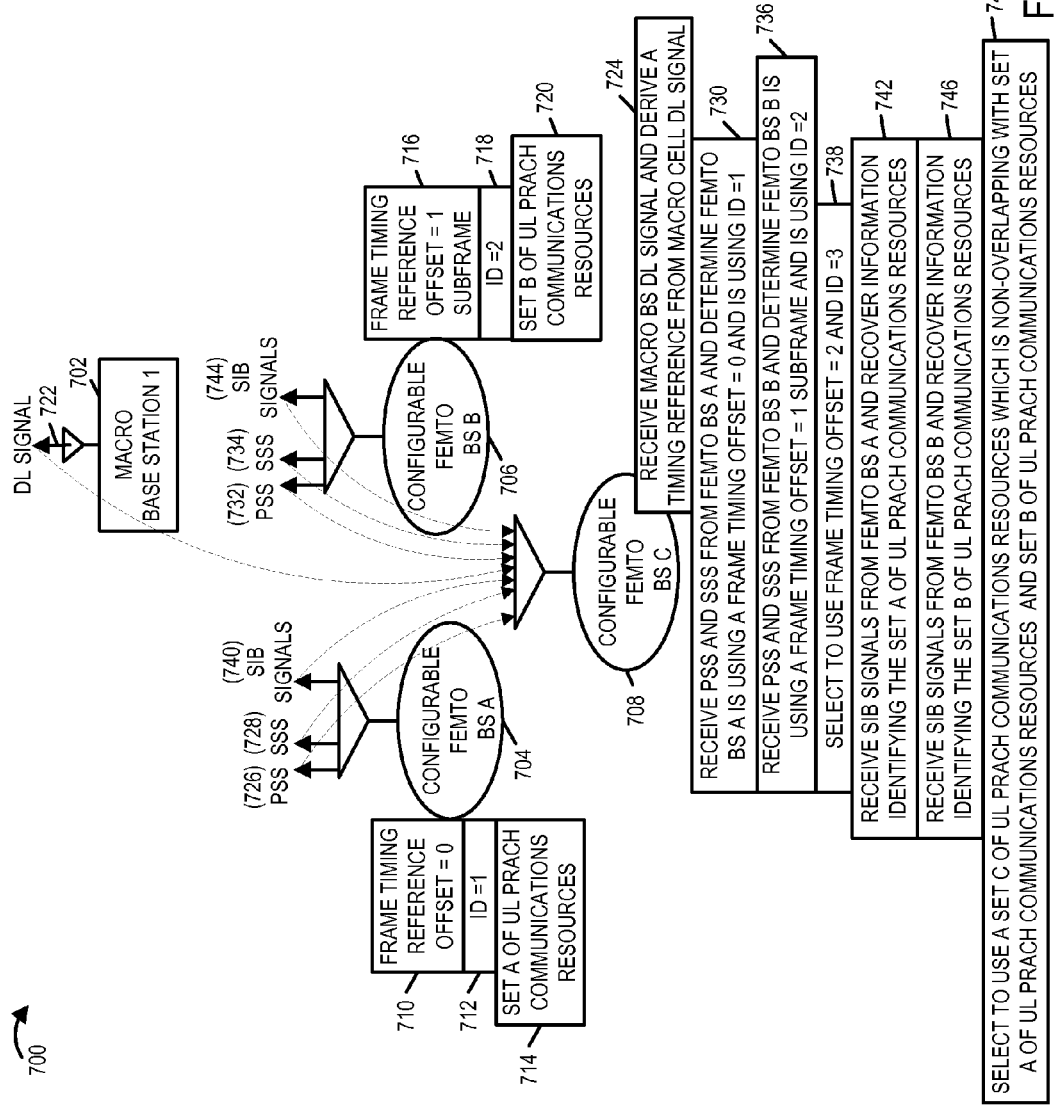
FIG. 7 illustrates the first part of an example of operating a configurable base station in accordance with an exemplary embodiment.
Figure 8:
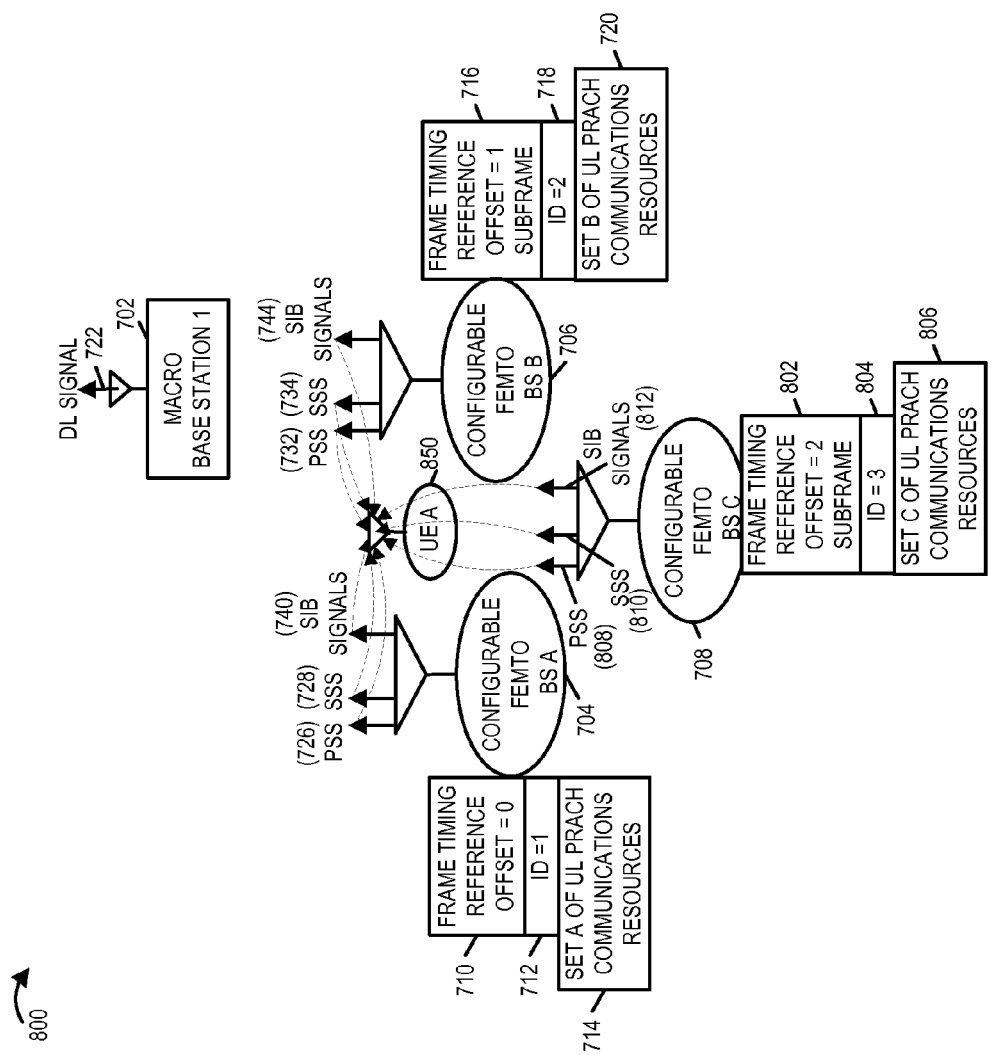
FIG. 8 illustrates the second part of an example of operating a configurable base station in accordance with an exemplary embodiment.

FIGS. 7-8 illustrate an example in which a configurable femto base station determines its frame timing based on detected frame timing of other femto base stations which are operating in its vicinity in accordance with an exemplary embodiment.

Drawing 700 of FIG. 7 illustrates an exemplary macro base station 1 702 and a plurality of configurable femto base stations (configurable femto BS A 704, configurable femto BS B 706, configurable femto BS C 708) which are located within the macro cell of macro base station 1 702. Consider that the femto BSs (704, 706, 708) are to use the same common shared frequency band. Further consider that there is to be symbol level synchronization and subframe level synchronization in the area in which the femto base stations (704, 706, 708) are operating; however, frame boundaries of different femto base stations may be, and sometimes are different, e.g., offset by multiples of subframes.

Consider that configurable femto BS A 704 and configurable femto BS B 706 have been previously configured and are operating. Femto BS A 704 has previously selected and is currently using: a frame timing reference offset=0 as indicated by block 710, an ID=1 as indicated by block 712, and a set A of uplink PRACH communications resources as indicated by block 714. Femto BS B 706 has previously selected and is currently using: a frame timing reference offset=1 subframe as indicated by block 716, an ID=2 as indicated by block 718, and a set B of uplink PRACH communications resources as indicated by block 720. Set A of uplink PRACH communications resources is non-overlapping with set B of uplink PRACH communications resources.

Macro base station 1 702 is transmitting downlink signal 722. Configurable femto BS C 708 receives macro BS DL signal 722 and derives a timing reference from the received macro cell DL signal 722, as indicated by block 724.

Femto BS A 704 is transmitting PSS 726 and SSS 728 at times in accordance with the femto base station A frame timing and communicating ID=1. Configurable BS C 708 receives PSS and SSS from femto BS A and determines that femto BS A is using a frame timing offset=0, with respect to the timing reference, and is using ID=1, as indicated by block 730.

Femto BS B 706 is transmitting PSS 732 and SSS 734 at times in accordance with the femto base station B frame timing and communicating ID=2. Configurable BS C 708 receives PSS and SSS from femto BS B and determines that femto BS B is using a frame timing offset=1 subframe, with respect to the timing reference, and is using ID=2, as indicated by block 736.

Configurable femto BS C 708 selects to use frame timing offset=2 subframes with respect to the timing reference, and selects to use ID=3. In this example, the structure is such that there are five alternative frame timing offsets: 0 subframes, 1 subframe, 2 subframes, 3 subframes, and 4 subframes. Configurable femto BS C 708 has intentionally selected to use a frame timing offset that is not currently being used by a femto base station in its local vicinity. Configurable femto BS C 708 has intentionally selected to use an ID that is not currently being used by a femto base station in its local vicinity.

Femto BS A 704 transmits SIB signals 740 at times in accordance with the femto BS A frame timing which communicate information identifying set A of uplink PRACH communications resources. Configurable femto BS C 708 receives SIB signals 740 from femto BS A and recovers information identifying the set A of uplink PRACH communications resources, as indicated by block 742. Femto BS B 706 transmits SIB signals 744 at times in accordance with the femto BS B frame timing which communicate information identifying set B of uplink PRACH communications resources. Configurable femto BS C 708 receives SIB signals 744 from femto BS A and recovers information identifying the set B of uplink PRACH communications resources, as indicated by block 746. Configurable femto BS C 708 selects to use a set C of uplink PRACH communications resources which is non-overlapping with set A of uplink PRACH communications resources and set B of uplink PRACH communications resources, as indicated by block 748.

Drawing 800 of FIG. 8 illustrates that configurable femto base station C 708 has self-configured in accordance with the selections described in FIG. 7. Femto BS C 708 has previously selected and is currently using: a frame timing reference offset=2 subframes as indicated by block 802, an ID=3 as indicated by block 804, and a set C of uplink PRACH communications resources as indicated by block 806.

Femto BS C 708 is transmitting PSS 808 and SSS 810 at times in accordance with the femto base station C frame timing and communicating ID=3. Femto BS C 708 transmits SIB signals 812 at times in accordance with the femto BS C frame timing which communicate information identifying set C of uplink PRACH communications resources.

Exemplary UE A 850 is able to receive and recover PSS/SSS signals and SIB signals from each of the femto base stations (704, 706, 708).

Figure 9:
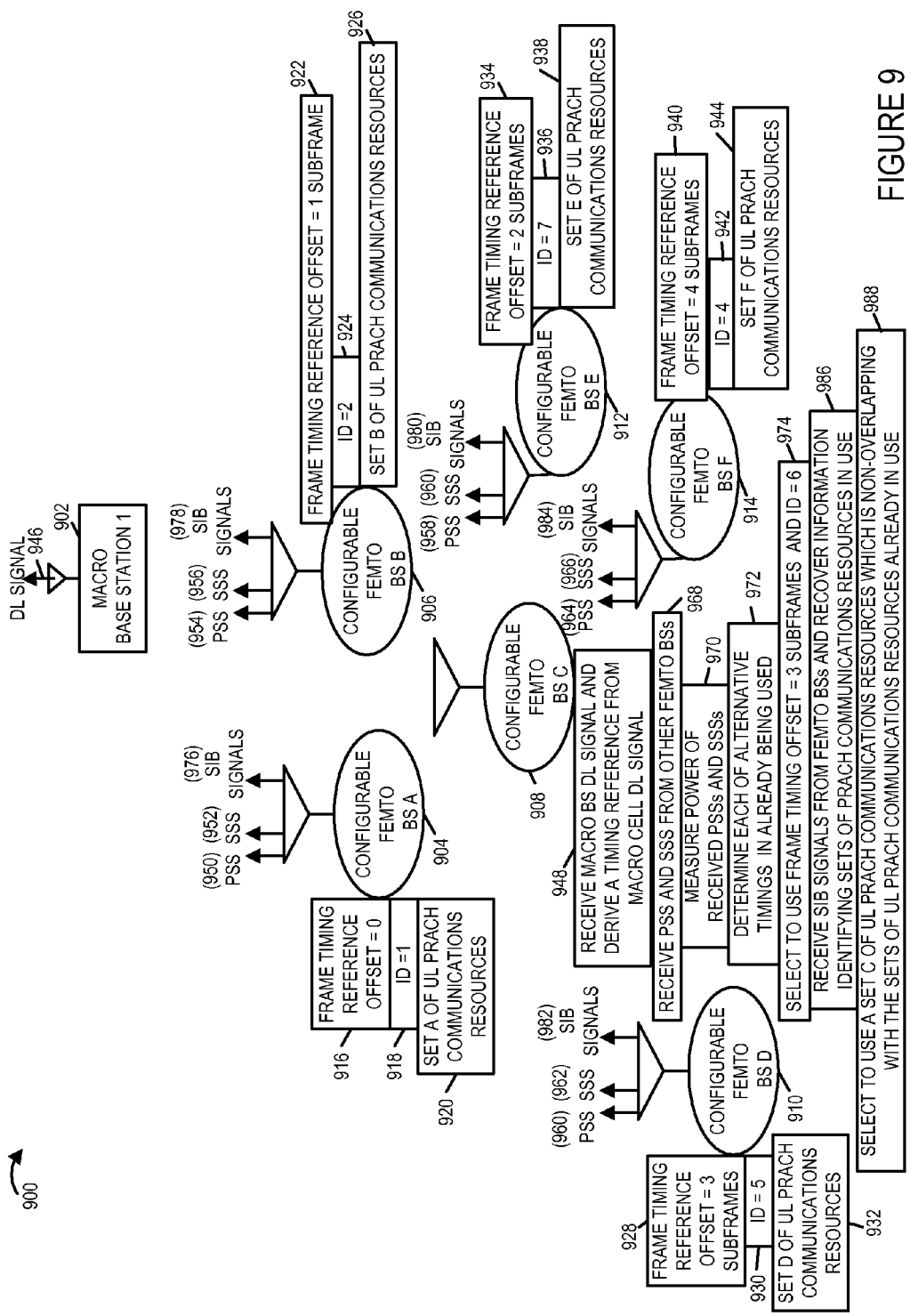
FIG. 9 illustrates the first part of another example of operating a configurable base station in accordance with an exemplary embodiment.
Figure 10:
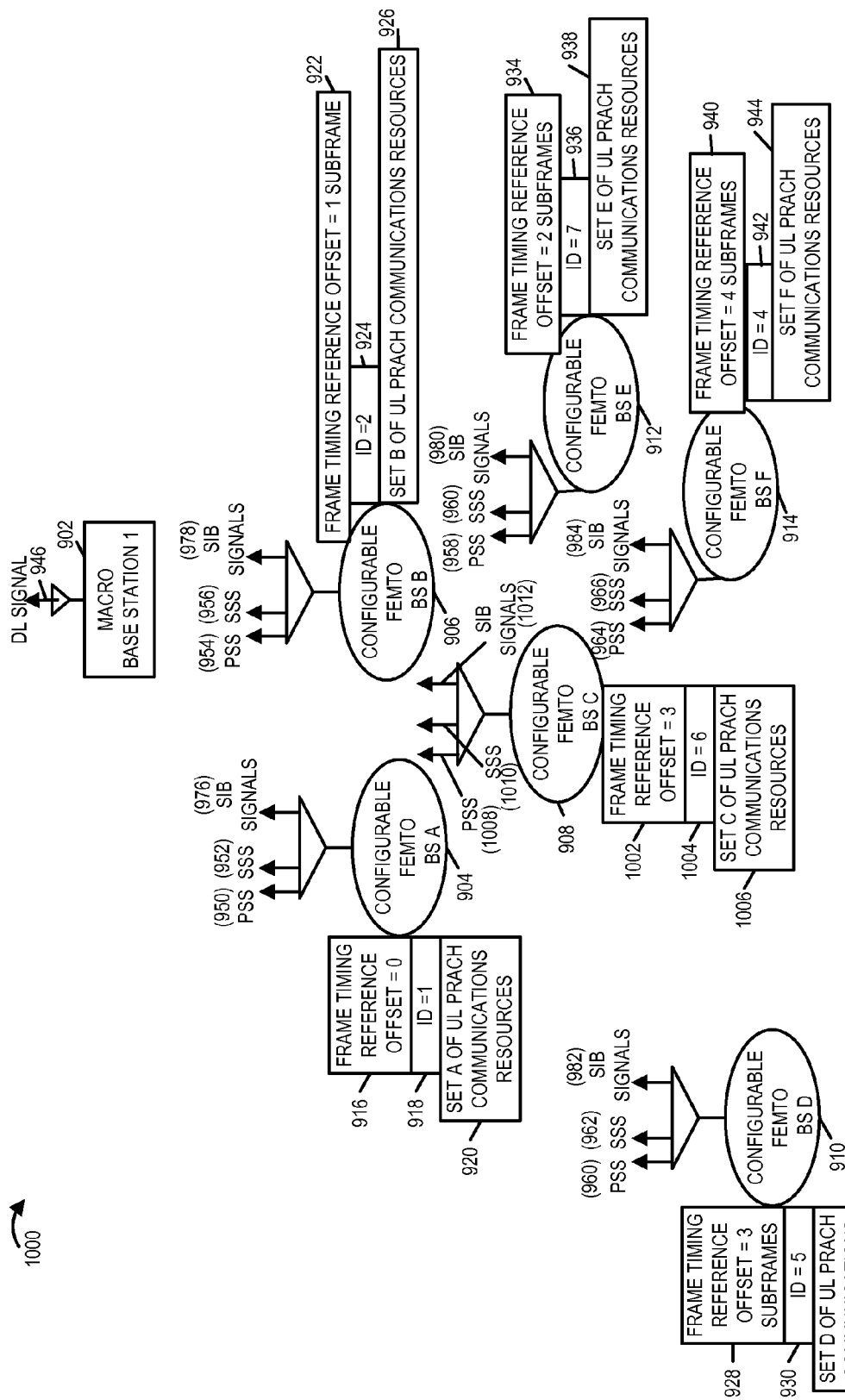
FIG. 10 illustrates the second part of another example of operating a configurable base station in accordance with an exemplary embodiment.

FIGS. 9-10 illustrate another example in which a configurable femto base station determines its frame timing based on detected frame timing of other femto base stations which are operating in its vicinity in accordance with an exemplary embodiment.

Drawing 900 of FIG. 9 illustrates an exemplary macro base station 1 902 and a plurality of configurable femto base stations (configurable femto BS A 904, configurable femto BS B 906, configurable femto BS C 908, configurable femto BS D 910, configurable femto BS E 912, configurable femto BS F 914) which are located within the macro cell of macro base station 1 902. Consider that the femto BSs (904, 906, 908, 910, 912, 914) are to use the same common shared frequency band. Further consider that there is to be symbol level synchronization and subframe level synchronization in the area in which the femto base stations (904, 906, 908, 910, 912, 914) are operating; however, frame boundaries of different femto base stations may be, and sometimes are different, e.g., offset by multiples of subframes.

Consider that configurable femto BS A 904, configurable femto BS B 906, configurable femto BS D 910, configurable femto BS E 912, and configurable femto BS F 914 have been previously configured and are operating. Femto BS A 904 has previously selected and is currently using: a frame timing reference offset=0 as indicated by block 916, an ID=1 as indicated by block 918, and a set A of uplink PRACH communications resources as indicated by block 920. Femto BS B 906 has previously selected and is currently using: a frame timing reference offset=1 subframe as indicated by block 922, an ID=2 as indicated by block 924, and a set B of uplink PRACH communications resources as indicated by block 926. Femto BS D 910 has previously selected and is currently using: a frame timing reference offset=3 subframes as indicated by block 928, an ID=5 as indicated by block 930, and a set D of uplink PRACH communications resources as indicated by block 932. Femto BS E 912 has previously selected and is currently using: a frame timing reference offset=2 subframes as indicated by block 934, an ID=7 as indicated by block 936, and a set E of uplink PRACH communications resources as indicated by block 938. Femto BS F 914 has previously selected and is currently using: a frame timing reference offset=4 subframes as indicated by block 940, an ID=4 as indicated by block 942, and a set F of uplink PRACH communications resources as indicated by block 944. Each set of uplink PRACH communications resources (set A, set B, set C, set D set E and set F) is non-overlapping with the other sets of uplink PRACH communications resources.

Macro base station 1 902 is transmitting downlink signal 946. Configurable femto BS C 908 receives macro BS DL signal 946 and derives a timing reference from the received macro cell DL signal, as indicated by block 948.

Femto BS A 904 is transmitting PSS 950 and SSS 952 at times in accordance with the femto base station A frame timing and communicating ID=1. Femto BS B 906 is transmitting PSS 954 and SSS 956 at times in accordance with the femto base station B frame timing and communicating ID=2. Femto BS E 912 is transmitting PSS 958 and SSS 960 at times in accordance with the femto base station E frame timing and communicating ID=7. Femto BS D 910 is transmitting PSS 960 and SSS 962 at times in accordance with the femto base station D frame timing and communicating ID=5. Femto BS F 914 is transmitting PSS 964 and SSS 966 at times in accordance with the femto base station F frame timing and communicating ID=4.

Configurable femto BS C 908 receives PSSs and SSSs from the other femto base stations, as indicated by block 968. Configurable femto BS C 908 measures the power of the received PSS and SSS signals, as indicated by block 970. Configurable femto base station C 908 determines each of the alternative timing already being used based on the received PSS and SSS signals. In this example, the structure is such that there are five alternative frame timing offsets: 0 subframes, 1 subframe, 2 subframes, 3 subframes, and 4 subframes. In this example each of the possible alternative timings are already being used by adjacent femto base stations. Configurable base station C 908 compares the received signal strengths of the received synchronization signals received from the adjacent femto base stations and determines which adjacent femto base station's signal is being received at the lowest power level. Configurable femto base station C 908 selects to use the frame timing with offset=3 subframes and selects to use ID=6, as indicated by block 974. Note that femto BS D 910, which is using offset=3 subframes, is the furthest away from femto BS C 908 and its received signals at femto BS C 908 are the weakest. Note, also that selected ID=6 is not being used by any of the other femto base stations (904, 906, 910, 912, 914).

Each of the femto base stations (904, 906, 912, 910, 914) transmits SIB signals (976, 978, 980, 982, 984), respectively at times in accordance with its own frame timing which communicate information identifying sets of uplink PRACH communications resources (set A of uplink PRACH communications resources, set B of uplink PRACH communications resources, set E of uplink PRACH communications resources, set D of uplink PRACH communications resources, set F of uplink PRACH communications resources), respectively. Configurable femto BS C 908 receives SIB signals from the femto BSs and recovers information identifying the sets of uplink PRACH communications resources which are in use, as indicated by block 986. Configurable femto BS C 908 selects to use a set C of uplink PRACH communications resources which is non-overlapping with each of the sets of uplink PRACH communications resources already in use, as indicated by block 988.

Drawing 1000 of FIG. 10 illustrates that configurable femto base station C 908 has self-configured in accordance with the selections described in FIG. 8. Femto BS C 908 has previously selected and is currently using: a frame timing reference offset=3 subframes as indicated by block 1002, an ID=6 as indicated by block 1004, and a set C of uplink PRACH communications resources as indicated by block 1006.

Femto BS C 908 is transmitting PSS 1008 and SSS 1010 at times in accordance with the femto base station C frame timing and communicating ID=6. Femto BS C 908 transmits SIB signals 1012 at times in accordance with the femto BS C frame timing which communicate information identifying set C of uplink PRACH communications resources.

Various aspects and/or features of some, but not necessarily all embodiments, are further discussed below. Various embodiments are directed to methods and/or apparatus for minimizing interference caused by adjacent base stations, e.g., femto cells, to the control information such as the synchronization signal and broadcast channel in LTE. This interference control facilitates the recovery by a UE device of important control information signals, e.g., SSS/PSS and/or PBCH signals being transmitted by adjacent base stations, e.g., adjacent femto base stations.

Symbol level synchronization is normally required for the schemes like fractional frequency reuse to work. Subframe level synchronization is also normally required for interference coordination schemes to work. However, frame level synchronization may cause crucial system information to collide. In consideration of the above observations, new developed methods and apparatus employ a simple solution to minimize interference to PSS/SSS and BCH signals.

Figure 11:
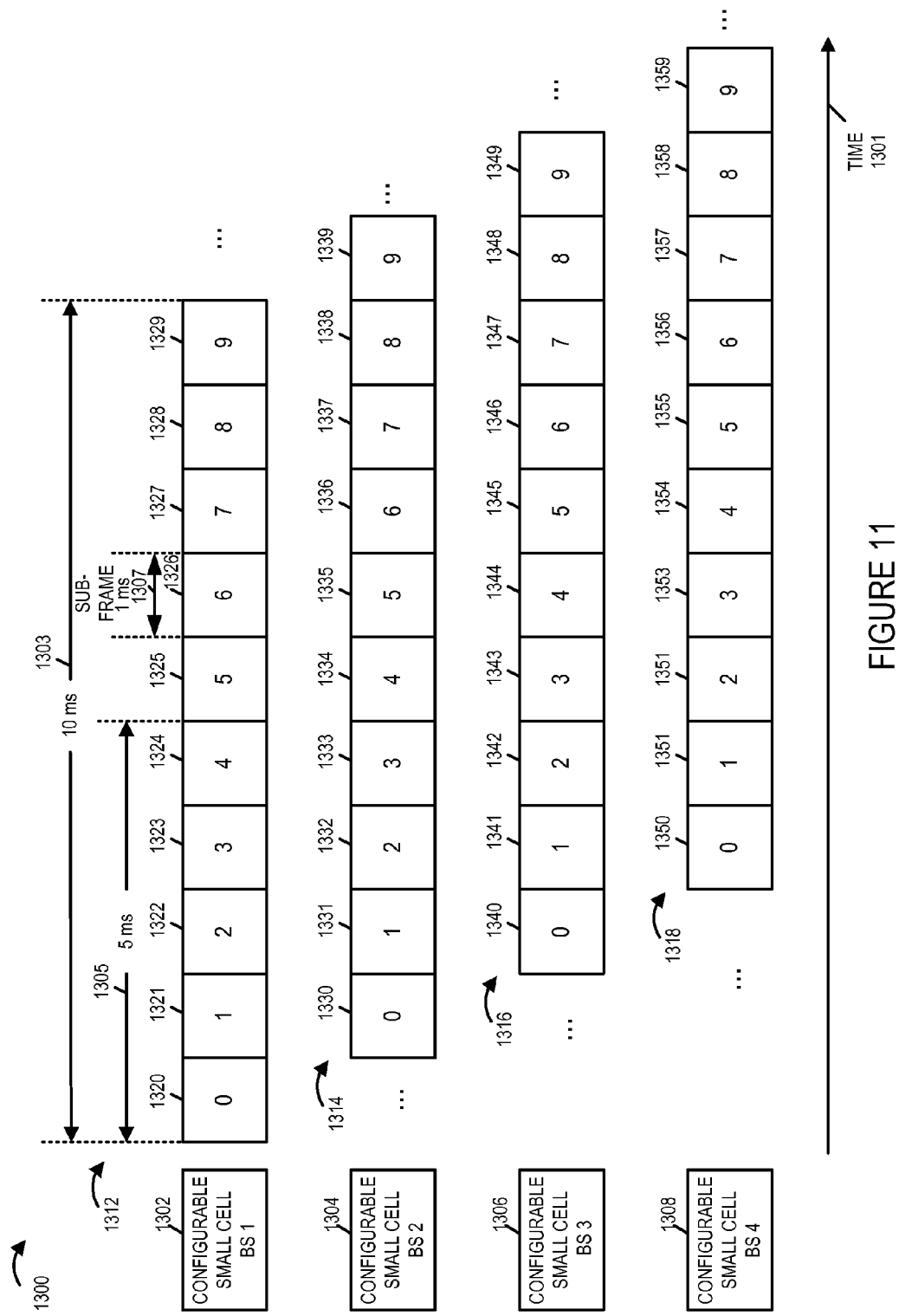
FIG. 11 illustrates an example in which four exemplary small cell configurable base stations, which are in the vicinity of one another, offset their frame boundaries in accordance with an exemplary embodiment.

In an exemplary embodiment, the small cells, e.g., femto cells, in an area are operated be synchronous at symbol level and at sub-frame level. Thus locally, e.g., adjacent femto cells tend to be synchronous at the symbol and subframe level in various embodiments. This can, and in some embodiments is, achieved by small cell base stations, e.g., femto cell base stations, listening to macro cell's DL signal in NETWORK_LISTEN mode and deriving their timing from the macro cell's DL timing. However, in accordance with a feature of some embodiments small cells offset their frame boundaries so that the boundaries do not align with other closeby, e.g., adjacent, small cells' frame boundaries. FIG. 11 depicts this solution pictorially.

Drawing 1300 of FIG. 11 illustrates 4 exemplary configurable small cell base stations (configurable small cell BS 1 1302, configurable small cell base station 2 1304, configurable small cell BS 3 1306, configurable small cell BS 4 1308) and corresponding frame timing (1312, 1314, 1316, 1318), respectively. Horizontal axis 1301 represents time. Exemplary configurable small cell BS 1 frame timing 1312 includes 10 subframes (subframe 0 1320, subframe 1 1321, subframe 2 1322, subframe 3 1323, subframe 4 1324, subframe 5 1325, subframe 6 1326, subframe 7 1327, subframe 8 1328, subframe 9 1329). Frame 1312 has a duration 10 milli-sec as indicated by line 1303; a half-frame has a duration of 5 milli-sec as indicated by line 1305, and a subframe has a duration of 1 milli-sec as indicated by line 1307.

Exemplary configurable small cell BS 2 frame timing 1314 includes 10 subframes (subframe 0 1330, subframe 1 1331, subframe 2 1332, subframe 3 1333, subframe 4 1334, subframe 5 1335, subframe 6 1336, subframe 7 1337, subframe 8 1338, subframe 9 1339). Exemplary configurable small cell BS 3 frame timing 1316 includes 10 subframes (subframe 0 1340, subframe 1 1341, subframe 2 1342, subframe 3 1343, subframe 4 1344, subframe 5 1345, subframe 6 1346, subframe 7 1347, subframe 8 1348, subframe 9 1349). Exemplary configurable small cell BS 4 frame timing 1318 includes 10 subframes (subframe 0 1350, subframe 1 1351, subframe 2 1352, subframe 3 1353, subframe 4 1354, subframe 5 1355, subframe 6 1356, subframe 7 1357, subframe 8 1358, subframe 9 1359).

This approach ensures that the PSS/SSS and the BCH of the closeby small cells with different frame timing do not collide. To reduce the interference to the synchronization signals and BCH channels of other cells, a small cell base station may, and in some embodiments does, also control its transmitters not to transmit anything or transmit with low power in a time/frequency resource block in which another small cell transmits its control signals such as PSS/SSS and BCH. For example, in FIG. 13, small cell base station 2 1304, small cell base station 3 1306, and small cell base station 4 1308 transmit with less power in the central 6 resource blocks of their subframes 9 1339, subframe 8 1348, and subframe 7 1357 respectively, to reduce interference to small cell base station 1's BCH transmission which occurs during small cell base station 1's subframe 0.

In case of user deployed small cell base stations, e.g., user deployed femto cell cell base stations, owned by individuals rather than the network operator, the small cell base station can determine the frame boundaries of nearby cells in NETWORK_LISTEN mode and pick a frame boundary that does not collide with any other small cell's boundary. If that is not possible, it picks the frame boundary such that it collides with the frame boundary of the farthest cell.

In various embodiments, a similar idea is used in allocating PRACH resources in the uplink. In some embodiments, the close by small cell base station allocates PRACH resources orthogonal in time and/or frequency to PRACH resources of close by cells. This reduces the false alarm and can improve efficiency of the small cells. If the small cells are idle, having overlapping PRACH resources may make multiple cells falsely turn ON and it can increase the interference to other cells. Thus, intentionally selecting PRACH communications resources which are not in use by close by small cells tends to reduce false alarms and decrease interference.

In various embodiments a device, e.g., a configurable base station in system 300 of FIG. 3, and/or a configurable base station 500 of FIG. 5, and/or a configurable base station of any of the FIGS. 3-13 includes a module corresponding to each of the individual steps and/or operations described with regard to any of the FIGS. 3-13 in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the device, e.g., configurable base station, cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., configurable base stations, network nodes, mobile nodes such as mobile terminals supporting peer to peer communications, access points such as base stations including femto base stations and macro base stations, and/or communications systems. Various embodiments are also directed to methods, e.g., method of controlling and/or operating configurable base stations, network nodes, mobile nodes, access points such as base stations including macro base stations and femto base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a configurable base station, including a processor configured to implement one, multiple or all of the steps of one or more methods of the invention.

In some embodiments, the processor or processors, e.g., CPUs, of one or more devices, e.g., communications nodes such as a configurable base station, network nodes, access nodes such as base stations including macro base stations and femto base stations and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., a communications node such as a configurable base station, with a processor which includes a module corresponding to each of the steps of the various described methods performed by the device in which the processor is included. In some but not all embodiments a device, e.g., a communications node such as a configurable base station, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited for communications systems supporting macro cellular communications, femto cellular communications, and peer to peer communications. Various embodiments are well suited to communications systems using a peer to peer signaling protocol, e.g., a peer to peer signaling protocol including peer discovery signaling, in at least portion of the system. Some embodiments use an Orthogonal Frequency Division Multiplexing (OFDM) based wireless peer to peer signaling protocol, e.g., WiFi signaling protocol or another OFDM based protocol. Some embodiments, are well suited for systems supporting LTE.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points such as macro base stations and femto base stations which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a configurable base station, comprising:
    receiving signals from a first adjacent base station;
    determining resource utilization information from said received signals, said determined resource utilization information including at least one of a first frame timing used to control transmission of broadcast control channel information by said first adjacent base station and a first set of uplink physical random access channel (PRACH) communications resources used by said first adjacent base station; and
    selecting, based on said determined resource utilization information, at least one of a second frame timing or a second set of uplink PRACH communications resources to be used by said configurable base station, said second frame timing being different from said first frame timing and said second set of uplink PRACH communications resources being different from said first set of uplink PRACH communications resources.

2. The method of claim 1,
    wherein said signals include a primary synchronization signal (PSS) and a secondary synchronization signal (SSS); and
    wherein determining resource utilization information includes determining said first frame timing.

3. The method of claim 2, wherein selecting, based on said determined resource utilization information, at least one of a second frame timing or a second set of uplink PRACH communications resources to be used by said configurable base station includes:
    determining a frame timing offset N which is a non-negative integer multiple of a subframe duration.

4. The method of claim 3, wherein N is in a range of 0 to 4; and
wherein PSS are transmitted in a sixth subframe of a frame.

5. The method of claim 3,
wherein when a number of adjacent base stations adjacent to the configurable base station, said number including the first adjacent base station, is less than X, where X is a difference in a number of subframes from one subframe used to transmit PSS signals to a next subframe used to transmit PSS signals, determining a frame timing offset includes:
selecting a first frame timing offset which produces a different frame boundary time than a frame boundary time used by any of the adjacent base stations.

6. The method of claim 5,
wherein when the number of adjacent base stations is equal to or greater than X, determining a frame timing offset includes:
selecting a frame timing of a base station from which a weakest signal was received.

7. The method of claim 1,
wherein said signals include a system information block (SIB) information signal; and
wherein determining resource utilization information includes determining at least one of tones, subframes and periodicity of uplink PRACH communications resources in said first set of uplink PRACH communications resources.

8. The method of claim 1, further comprising:
determining, from the received signals, base station identifiers being used by adjacent base stations; and
selecting a different base station identifier than those determined to be in use by the adjacent base stations.

9. The configurable base station of claim 8, wherein said means for determining a frame timing offset includes:
means for selecting a first frame timing offset which produces a different frame boundary time than a frame boundary time used by any of the adjacent base stations, when a number of adjacent base stations adjacent to the configurable base station, said number including the first adjacent base station, is less than X, where X is a difference in a number of subframes used to transmit PSS signals to a next subframe used to transmit PSS signals.

10. The configurable base station of claim 9, wherein said means for determining a frame timing offset includes:
means for selecting a frame timing of a base station from which a weakest signal was received, when the number of adjacent base stations is equal to or greater than X.

11. A configurable base station, comprising:
means for receiving signals from a first adjacent base station;
means for determining resource utilization information from said received signals, said determined resource utilization information including at least one of a first frame timing used to control transmission of broadcast control channel information by said first adjacent base station and a first set of uplink PRACH communications resources used by said first adjacent base station; and
means for selecting, based on said determined resource utilization information, at least one of a second frame timing or a second set of uplink PRACH communications resources to be used by said configurable base station, said second frame timing being different from said first frame timing and said second set of uplink PRACH communications resources being different from said first set of uplink PRACH communications resources.

12. The configurable base station of claim 11,
wherein said signals include a primary synchronization signal (PSS) and a secondary synchronization signal (SSS); and
wherein said means for determining resource utilization information includes
means for determining said first frame timing.

13. The configurable base station of claim 11,
wherein said signals include a system information block (SIB) information signal; and
wherein said means for determining resource utilization information includes means for determining at least one of tones, subframes and periodicity of uplink PRACH communications resources in said first set of uplink PRACH communications resources.

14. The configurable base station of claim 13, wherein said means for selecting, based on said determined resource utilization information, at least one of a second frame timing or a second set of uplink PRACH communications resources to be used by said configurable base station includes:
means for determining a frame timing offset N which is a non-negative integer multiple of a subframe duration.

15. A computer program product for use in a configurable base station, the computer program product comprising:
a non-transitory computer readable medium comprising:
code for causing at least one computer to receive signals from a first adjacent base station;
code for causing said at least one computer to determining resource utilization information from said received signals, said determined resource utilization information including at least one of a first frame timing used to control transmission of broadcast control channel information by said first adjacent base station and a first set of uplink PRACH communications resources used by said first adjacent base station; and
code for causing said at least one computer to select, based on said determined resource utilization information, at least one of a second frame timing or a second set of uplink PRACH communications resources to be used by said configurable base station, said second frame timing being different from said first frame timing and said second set of uplink PRACH communications resources being different from said first set of uplink PRACH communications resources.

16. A configurable base station comprising:
at least one processor configured to:
receive signals from a first adjacent base station;
determine resource utilization information from said received signals, said determined resource utilization information including at least one of a first frame timing used to control transmission of broadcast control channel information by said first adjacent base station and a first set of uplink PRACH communications resources used by said first adjacent base station; and
select, based on said determined resource utilization information, at least one of a second frame timing or a second set of uplink PRACH communications resources to be used by said configurable base station, said second frame timing being different from said first frame timing and said second set of uplink PRACH communications resources being different from said first set of uplink PRACH communications resources; and memory coupled to said at least one processor.

17. The configurable base station of claim 16, wherein said signals include a primary synchronization signal (PSS) and a secondary synchronization signal (SSS); and wherein said at least one processor is configured to determine said first frame timing, as part of being configured to determining resource utilization information.

18. The configurable base station of claim 17, wherein said at least one processor is configured to determine a frame timing offset N which is a non-negative integer multiple of a subframe duration, as part of being configured to select, based on said determined resource utilization information, at least one of a second frame timing or a second set of uplink PRACH communications resources to be used by said configurable base station.

19. The configurable base station of claim 18, wherein said at least one processor is configured to select a first frame timing offset which produces a different frame boundary time than a frame boundary time used by any of the adjacent base stations when a number of adjacent base stations adjacent to the configurable base station, said number including the first adjacent base station, is less than X, where X is a difference in a number of subframes from one subframe used to transmit PSS signals to a next subframe used to transmit PSS signals, as part of being configured to determine a frame timing offset.

20. The configurable base station of claim 16, wherein said signals include a system information block (SIB) information signal; and wherein said at least one processor is configured to determining at least one of tones, subframes and periodicity of uplink PRACH communications resources in said first set of uplink PRACH communications resources, as part of being configured to determine resource utilization information.

* * * * *